US007124147B2

(12) United States Patent
Perry

(10) Patent No.: US 7,124,147 B2
(45) Date of Patent: Oct. 17, 2006

(54) DATA STRUCTURES RELATED TO DOCUMENTS, AND QUERYING SUCH DATA STRUCTURES

(75) Inventor: Russell Perry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 481 days.

(21) Appl. No.: 10/700,271

(22) Filed: Oct. 30, 2003

(65) Prior Publication Data

US 2004/0221229 A1    Nov. 4, 2004

(30) Foreign Application Priority Data

Apr. 29, 2003    (GB)    ................... 0309665.8

(51) Int. Cl.
*G06F 17/00* (2006.01)
(52) U.S. Cl. .................. 707/102; 707/101; 707/103 R; 707/3
(58) Field of Classification Search ...................... None
See application file for complete search history.

(56) References Cited

U.S. PATENT DOCUMENTS

| | | | | |
|---|---|---|---|---|
| 6,408,311 B1 | 6/2002 | Baisley et al. | ............... | 707/203 |
| 2004/0073541 A1* | 4/2004 | Lindblad et al. | ............... | 707/3 |
| 2004/0088320 A1* | 5/2004 | Perry | ...................... | 707/103 R |

OTHER PUBLICATIONS

W3C XML Path Language version 1.0 dated 1999.*
XML.com creating Web Utilities Using XML : : XPath, dated Jan. 10, 2001. What is XQuery dated Oct. 16, 2002.*
XML.com Path Experssions and Relationship to XPath dated Oct. 16, 2002.*

* cited by examiner

*Primary Examiner*—Sana Al-Hashemi

(57) ABSTRACT

A parser for parsing documents comprising a Document Order List Creator, a YPath Table Creator, and a ZPath Table Creator. The arrangement of the Document Order List creator being such that it is adapted to produce a Document Order List (DOL) correlating a unique index number with an associated node, and the Document Order List creator being adapted to allocate each node in a document parsed its own unique index number in the DOL. The arrangement of the YPath Table Creator is such that it is adapted to produce a YPath Table having a set of sequences of node names representative of all sequences of node names encountered in traversing from the root node to all possible nodes in the document parsed, and associated with each sequence of node names a corresponding group of index numbers corresponding to the index numbers in the DOL for which the associated sequence of node names is true. The arrangement of the ZPath Table Creator is adapted to create a ZPath Table having a set of sequences of ordinals representative of ordinals of those nodes encounterable in traversing from the root node to all possible nodes in the document, the ordinal of a node being the integer value position of the node amongst those nodes of the same name which share the same parent node, and associated with each set of sequences of ordinals, a corresponding group of index numbers corresponding to the index numbers in the DOL for which the associated sequence of ordinals for nodes is true.

38 Claims, 15 Drawing Sheets

DOL

| Index | Type | Name | Value |
|---|---|---|---|
| 0 | E | AddBook | |
| 1 | E | Address | |
| 2 | A | Type | Uk |
| 3 | E | Firstname | |
| 4 | T | | John |
| 5 | E | Surname | |
| 6 | T | | Smith |
| 7 | E | Street | |
| 8 | T | | 1 Broad Street |
| 9 | E | City | |
| 10 | T | | Bristol |
| 11 | E | Postcode | |
| 12 | T | | BS1 ABC |
| 13 | E | Address | |
| 14 | A | Type | Uk |
| 15 | E | Firstname | |
| 16 | T | | Jane |
| 17 | E | Surname | |
| 18 | T | | Brown |
| 19 | E | Street | |
| 20 | T | | 34 Tree Ave. |
| 21 | E | City | |
| 22 | T | | Norwich |
| 23 | E | Postcode | |
| 24 | T | | NW7 EFG |
| 25 | E | Address | |
| 26 | A | Type | Us |
| 27 | E | Firstname | |
| 28 | T | | Richard |
| 29 | E | Surname | |
| 30 | T | | Beckett |
| 31 | E | Street | |
| 32 | T | | 184 Central Avenue |
| 33 | E | City | |
| 34 | T | | San Jose |
| 35 | E | State | |
| 36 | T | | California |
| 37 | E | Zip | |
| 38 | T | | 12345 |
| 39 | E | Address | |
| 40 | A | Type | Uk |
| 41 | E | Firstname | |
| 42 | T | | Karen |
| 43 | E | Surname | |
| 44 | T | | Beckett |
| 45 | E | Street | |
| 46 | T | | 8 Victoria Square |
| 47 | E | City | |
| 48 | T | | Cheltenham |
| 49 | E | Postcode | |
| 50 | T | | C6 JKL |

*Fig. 3*

YPath Table

| | |
|---|---|
| addBook | 0 |
| addBook\address | 1 13 25 39 |
| addBook\address\@type | 2 14 26 40 |
| addBook\address\firstname | 3 15 27 41 |
| addBook\address\firstname\text | 4 15 28 42 |
| addBook\address\surname | 5 17 29 43 |
| addBook\address\surname\text | 6 18 30 44 |
| addBook\address\street | 7 19 31 45 |
| addBook\address\street\text | 8 20 32 46 |
| addBook\address\city | 9 21 33 47 |
| addBook\address\city\text | 10 22 34 48 |
| addBook\address\postcode | 11 23 49 |
| addBook\address\postcode\text | 12 24 50 |
| addBook\address\state | 35 |
| addBook\address\state\text | 36 |
| addBook\address\zip | 37 |
| addBook\address\zip\text | 38 |

*Fig. 4*

ZPath Table

| | |
|---|---|
| 1 | 0 |
| 1/1 | 1 |
| 1/2 | 13 |
| 1/3 | 25 |
| 1/4 | 39 |
| 1/1/1 | 2 3 5 7 9 11 |
| 1/2/1 | 14 15 17 19 21 23 |
| 1/3/1 | 26 27 29 31 33 35 37 |
| 1/4/1 | 40 41 43 45 47 49 |
| 1/1/1/1 | 4 6 8 10 12 |
| 1/2/1/1 | 16 18 20 22 24 |
| 1/3/1/1 | 28 30 32 34 36 38 |
| 1/4/1/1 | 42 44 46 48 50 |

*Fig 5*

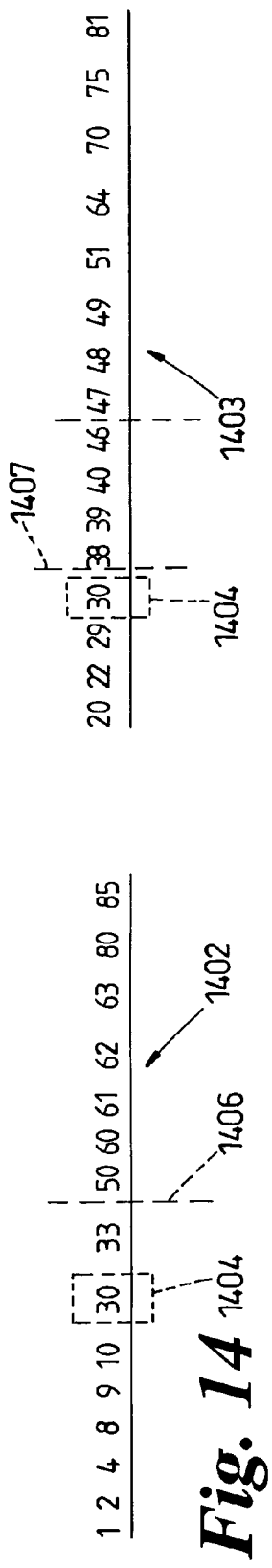
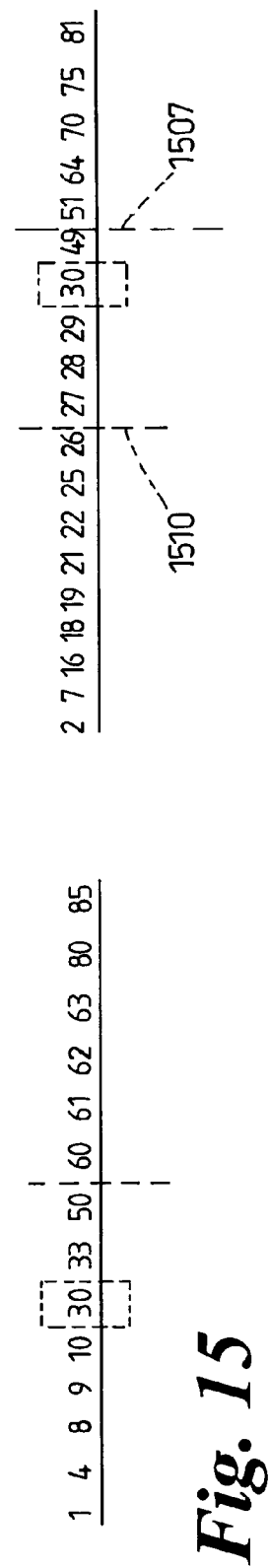
*Fig. 14*
*Fig. 15*

DATA STRUCTURES RELATED TO DOCUMENTS, AND QUERYING SUCH DATA STRUCTURES

FIELD OF THE INVENTION

This invention relates to data structures for representing documents, for example XML documents, and to querying such data structures and includes, as a non-limiting group; data structures; software for creating data structures; a computer memory holding data; a method of holding data representative of a document in a memory; a method of querying a data structure, software for querying a data structure, and a processor configured to store data representing a document and/or query a data structure representative of a document.

BACKGROUND OF THE INVENTION

It will be convenient to discuss as background XML documents and known XML query techniques, but it will be appreciated that the invention is broader than that and applies to storing and querying data representative of documents generally.

At present an XML document, for example an address list with 1000 individuals and their addresses on it, is received by a user's computer and parsed by an XML reader. This stores an internal memory representation, or map, of the XML document in a memory of the computer. This is often termed the "Document Tree" and identifies nodes of the document.

To search for a specified node requires "walking the tree", which involves comparing each node of the tree with a target node and looking for a match. This can be quick if by luck the target node is near the start of the tree, but if it is the $1000^{th}$ node the comparison process has to go through 999 comparisons before it finds it. This can be a time consuming activity.

XPath expressions are used to query XML documents. They can specify a node or a plurality of nodes that contain target nodes, and walk the tree, as discussed above.

An XPath query to retrieve a particular node or nodes is of the kind:
A[m]/B[n]/C[o]/ . . . Z[y].

A is a root node (or perhaps context node—see later), and B is a child node of node A, and C is a child node of node B etc; and where m, n, o etc are ordinal integers indicating which ordinal of the node A, B, C etc is to be the child node taken in the pathway from the root node A to the final node Z[y]. The XPath query expression A[m]/B[n]/C[o] . . . effectively gives instructions to the parser to navigate the Document Tree from a start node to an end node or nodes to be retrieved.

It will be helpful to include at this point a brief discussion of terms used in XML and its structure.

An XML formatted data file contains a mixture of markup language and content. The markup provides a logical structure to the content and may also optionally have semantic meaning that a machine can be programmed to deal with.

Because the markup and content (text) are mixed, it is necessary to use some syntax to delimit the markup from the content. XML uses the characters '<' and '>' to separate a string of characters from the content. So the text "<root>" is a piece of markup language. The XML specification requires that the content and other markup following <root> is enclosed by an end tag as follows </root>. The <root> is referred to as a start tag and the two tags, together with the enclosed content, is a node called ELEMENT. Somewhat more loosely the nodes <root> and </root> are called the start element and the end element.

Nodes that are elements can contain other elements and content. Elements can also include ATTRIBUTES. An attribute can be considered to be defined inside a start tag and consists of a name followed by the '=' followed by the attribute value which is within a double quoted string. For example in the XML expression: <root id="123"></root>, id is an attribute, it's name is id, and it's value is 123.

XML parsers that parse an XML data file into computer memory generally store the XML document as a tree structure which is a familiar structure used in computer science. They also use the term NODE. A start and end tag denote a node. An attribute is a node, and the text content contained within a start and end tag is considered to be included in a TEXT node. Other types of node which could be encountered include processing instructions and CDATA sections.

For the XML below
<root id="123">hello</root> there are three nodes. The 'root' is a node (of type element), 'id' is a node (of type attribute), and hello is inside a node (of type TEXT).

The node representing the 'root' has the name root. The node representing 'id' has the name id. For XML there is no node name associated with the text node, although for the purposes of this patent all text nodes will have the default name text. A text node cannot contain any other nodes. Thus it must be a leaf node of the document tree.

The primary purpose of XPath is to provide a language for addressing parts of an XML language. The specification for XML is widely available, for example it is available from the W3C site http://www.w3.org. In this patent the expression XPath query is used to denote that the specification of an XPath is tantamount to querying an XML document.

In general an XPath expression can evaluate to a node, a set of nodes (unordered), a string (a sequences of characters), a boolean (true or false) or a number (floating point).

Many common XPath queries of practical importance are of the form
A[expression]/B[expression]/C/[expression] . . .

where A, B and C are element names and the expression is defined by a grammar. Note this is not a definition, but a common pattern. An expression can be of the form, for example, of position( )>2 where position is a known function. The expression can also be just a single integer. Another example of an XPath query illustrating the use of expressions more fully is
document/subsection[@type="important"]

which returns all the "subsection" elements inside the "document" element which have an attribute with name "type" and value "important". The expression in this case is @type="important". Because the document is not followed by square brackets it is assumed to mean [1], i.e. the first element.

As previously discussed, XPath queries may take the form A[m]/B[n]/C[o] where A, B and C are tag names and m, n and o are ordinal (integers). The meaning of the expression is as follows. The separator character '/' denotes that the element to the left is the parent of the element to the right. The integer value inside the square brackets e.g. A [m] specifies the mth occurrence of the element A amongst its siblings (nodes that are the children of the same parent node) also with the same name A. So the example above asks for the oth occurrence of the node with name C which is a child of the nth occurrence of the node with name B which in turn is the child of the mth occurrence of the node with name A.

A known modification in an XPath query is that instead of beginning to walk the document tree from the first node, it is possible to walk it from a reference point, or context node, closer to the desired target node. Whilst this may reduce the extent to which it is luck dictating whether the target node is near the start or end of the relevant portion of the tree, it does not eliminate the issue.

An alternative is to use a relational database. This generally requires setting up database tables, and typically there is quite a degree of processing overhead to run relational data integrity rules, and other software infrastructure necessary for the relational database to operate. This can make extracting the answer to a query slow. Furthermore, relational database software is often produced by a propriety vendor (eg. Oracle™) and may not be readily portable between different users and operating systems.

SUMMARY OF THE INVENTION

According to a first aspect of the invention there is provided a parser for parsing documents comprising a Document Order List Creator, a YPath Table Creator, and a ZPath Table Creator;

the arrangement of the Document Order List creator being such that it is adapted to produce a Document Order List (DOL) correlating a unique index number with an associated node, and the Document Order List creator being adapted to allocate each node in a document parsed its own unique index number in the DOL;

and wherein the arrangement of the YPath Table Creator is such that it is adapted to produce a YPath Table having a set of sequences of node names representative of all sequences of node names encountered in traversing from the root node to all possible nodes in the document parsed, and associated with each sequence of node names a corresponding group of index numbers corresponding to the index numbers in the DOL for those nodes in the DOL for which the associated sequence of node names is true for a traversed pathway from the root node to the specified node, each node name sequence encounterable in parsing from the root node to any other node in the document appearing only once in the YPath Table; and wherein the arrangement of the ZPath Table Creator is adapted to create a ZPath Table having a set of sequences of ordinals representative of ordinals of those nodes encounterable in traversing from the root node to all possible nodes in the document, the ordinal of a node being the integer value position of the node amongst those nodes of the same name which share the same parent node, and associated with each set of sequences of ordinals, a corresponding group of index numbers corresponding to the index numbers in the DOL for those nodes in the DOL for which the associated sequence of ordinals for nodes is true for a traversed pathway from the root node to the specified node, each sequence of ordinals encounterable in parsing from the root node to any other node appearing only once in the ZPath Table.

The DOL is preferably an ordered list of nodes encountered in the DOL when the document is parsed, in a depth first manner.

The DOL creator may be arranged to produce the DOL depth first, in the order that node names and values (both being nodes) appear in the document.

The YPath creator may be arranged to produce the YPath Table depth first, in the order that nodes appear in the document The ZPath creator may be arranged to produce the ZPath Table depth first.

The DOL creator may be adapted to allocate unique index numbers to values of node names (value again being a node), again possibly allocated depth first as the node names and values are encountered in the document.

A node, for example a node name or a value, may be associated with a "type". For example types of nodes can include element nodes, attribute nodes, and text nodes, to name but three. There can be times when the distinction between a node being of type "text" and a default node for text entries hence node name TEXT, can be useful, for example.

The DOL may have a column for index numbers and at least one, or any combinations of columns for:
   (i) node type
   (ii) node name
   (iii) node value
Node value may comprise text material.

Whilst the document is preferably an XML document it could be another type of document that can be logically represented as a tree of connected nodes.

According to another aspect of the invention there is provided a data structure representative of a document comprising a Document Order List, a Node Name Sequence List, and an Ordinal Sequence List;

the DOL having a correlation of each node in the document with a unique index number;

the Node Name Sequence List having a correlation of (i) each possible sequence of node names encountered in traversing the document from the root node to all nodes with (ii) the index numbers in the DOL associated with nodes for which each particular node name sequence is true;

the Ordinal Sequence List having a correlation of (i) each node name ordinal sequence that it is possible to have in traversing the document from the root node to all nodes with (ii) the index numbers in the DOL associated with the nodes in the DOL for which each particular node name ordinal sequence is true.

Preferably the data structure represents an XML document, or other document represented as a tree of connected nodes.

According to another aspect of the invention there is provided a method of querying a data structure representative of a document, the data structure being in accordance with the preceding aspect of the invention, comprising the steps of:— querying the Node Name Sequence List and/or the Ordinal Sequence List for a target node or nodes to identify index numbers associated with the target node and returning the index number or numbers as a proxy for the node or nodes represented in the DOL.

The method may comprise returning all values in the DOL associated with all index numbers identified by querying:
   (i) the Node Sequence List alone; or
   (ii) the Ordinal Sequence List alone; or
   (iii) the common, intersection, index numbers present in querying both the Node Name Sequence List and the Ordinal Sequence List.

Preferably the query of the Node Sequence List produces a first sequence of index numbers and the query of the Ordinal Sequence List produces a second sequence of index numbers and wherein the common index number or numbers present in both the first and second sequences of index numbers is identified by partitioning each of the two lists into a lower index number range and a higher index number range divided by dividing points respective to each sequence, and comparing index numbers from the lower index number range of the first sequence with index numbers from the lower index number range of the second sequence, and comparing index numbers from the higher index number range of the first sequence with index numbers from the higher index number range of the second sequence.

Preferably the method comprises dividing the first and second index number sequences by splitting them into upper and lower ranges and pairing upper pairs and lower pairs, to create further pairs of index number sequences from the YPath and ZPath returns, and if necessary further dividing said further pairs to created subsequent generation pairs of YPath and ZPath returns until a match is found between index numbers of said pairs, further pairs, or subsequent generation pairs, of YPath and ZPath index number sequences.

Preferably the method comprises comparing both the lowest and highest index numbers in the YPath return sequence of index numbers with both the highest and lowest index numbers of a Zpath return sequence of index numbers, and also comparing the mid point index number in the YPath return with the mid point index number in the ZPath return.

Preferably the method comprises comparing the lowest and/or highest index number of the one of (i) and YPath return sequence of index numbers, or (ii) the ZPath return sequence of index numbers, with a mid point index number from the other of (i) or (ii).

Preferably a pair of index number sequences representative of a YPath Query return and a ZPath query return have index numbers in each of the pair of index number sequences removed from consideration for being the intersection, the removed index numbers comprising:
(i) those index numbers from one sequence of the pair that are lower than the lowest index number in the other sequence of the pair, and vice-versa, those index numbers from said other sequence of the pair that are lower than the lowest index number in said one sequence of the pair; and
(ii) those index numbers from one sequence of the pair that are higher than the highest index number of the sequence of the pair, and vice-versa, those index numbers from said other sequence of the pair that are higher than the highest index number from said one sequence of the pair.

At least one, and preferably a plurality of, or all, of the following checks may be performed to determine if a matching index number can be found in the YPath return sequence of index numbers and the Z Path return sequence of index numbers:
(i) does the minimum index number of the first sequence equal the minimum index number of the second sequence;
(ii) does the maximum index number of the first sequence equal the maximum index number of the second sequence;
(iii) does the minimum index number of the first sequence equal the maximum index number of the second sequence;
(iv) does the minimum index number of the second sequence equal the maximum index number of the first sequence;
(v) does the mid index number of the first sequence equal the mid index number of the second sequence.

At least one of, a plurality of, or all of, the following additional checks may be performed to determine if a matching index number can be found in the YPath return sequence of index numbers and the ZPath return sequence of numbers:
(i) does the minimum index number of the first sequence equal the mid index number of the second sequence;
(ii) does the maximum index number of the first sequence equal the mid index number of the second sequence;
(iii) does the mid index number of the first sequence equal the minimum index number of the second sequence;
(iv) does the mid index number of the first sequence equal the maximum index number of the second sequence.

Preferably the mid index number of a sequence is consistently taken as the number below, or consistently taken as the number above, the mid point if there is an even number of index numbers in the sequence.

According to another aspect of the invention there is provided a computer memory holding a YPath Table, a ZPath Table and a Document Order List derived from and representative of a document to be queried, the Document Order List comprising a list of nodes in the document and an index number uniquely associated with each node; and wherein
the YPath Table comprises a set of sequences of node names traversed in navigating from a root node to each specific node in the document, and associated with each particular sequence of node names a corresponding list of index numbers representative of the nodes in the document for which that particular node name sequence is true; and
the ZPath Table comprises a set of sequences of ordinals of node names encountered when traversing the document from the root node to any node in the document, and associated with each ordinal sequence the index numbers equivalent to the nodes for which that ordinal sequence for nodes traversed is true.

Preferably the index numbers associated with each node name sequence in the YPath Table are ordered in the sequence in which they are encountered when the document is parsed.

Preferably the index numbers associated with nodes for which each ordinal sequence in the ZPath Table is true are ordered in the sequence in which they are encountered when the document is parsed.

According to another aspect of the invention there is provided a method of making an XPath query comprising resolving the query into a YPath query and a ZPath query, and querying a YPath Node Name Sequence Table with the YPath query and a ZPath Node Sequence Table with the ZPath query, where YPath is a node name sequence of an XPath sequence but with no ordinals, and where ZPath is an ordinal sequence for a node name sequence of an XPath query, but with no node names.

According to another aspect of the invention there is provided a method of holding data representative of a document in a computer readable memory comprising storing in the memory a data structure representative of a document comprising a Document Order List, a YPath Table, and a ZPath Table; the Document Order List comprising a correlation between (i) each node in the document being represented and (ii) a unique index number;
a YPath Table comprising a correlation between (i) each possible node name sequence traversable in the document to reach a node in the document and (ii) the index numbers for nodes which are locatable using that node name sequence;
a ZPath Table comprising a correlation between (i) each possible ordinal sequence for nodes traversed to reach a node in the document and (ii) the index numbers for the nodes which are locatable using that ordinal sequence.

The document may be parsed in a: (i) depth first ordering system; (ii) breadth first ordering system.

The method may include performing the step of adding a new node, said step of adding a node comprising:

resolving an XPath instruction into a YPath and a ZPath component;

checking the YPath Table to determine whether the YPath component exists and if no YPath equivalent to the YPath component of the node to be added exists;

adding as a new entry to the YPath Table the YPath component for the node, comprising a node name sequence;

adding the new node to the DOL and associating an index number with it in the DOL;

adding the index number for the node to the YPath and ZPath Tables.

The index number allocated to the new node may be a number sequential in the index numbers in the order in which the nodes are encountered when parsing the document.

The existing nodes downstream of the new node in the document may have their associated index numbers incremented in the DOL, YPath Table and ZPath Table in order to interleave the new node in the index number sequence.

The method may include performing the step of deleting a node, said node being identified by a unique index number I1, and said method comprising; resolving an XPath instruction into YPath and ZPath components;

checking the YPath and ZPath Tables to determine whether there exist subsequent siblings to the node to be deleted, the next sibling being identified by unique index number I2;

deleting nodes with unique index numbers greater than or equal to I1 from the DOL, YPath Table and ZPath Table should I2 not exist;

deleting nodes with unique index numbers with a value between I1 and I2, including I1 but excluding I2 from the DOL, YPath Table and ZPath Table should I2 exist.

The unique index numbers of nodes with a value greater than I2 may be decremented by a value equal to (I2−I1).

According to another aspect of the invention there is provided software for querying a data structure in accordance with any previous aspect of the invention, the software comprising:

a YPath query engine adapted in use when operating on a computer processor, to make a YPath query of the YPath Table for a node or nodes locatable with a specified node name sequence and to return index numbers for nodes satisfying the query;

a ZPath query engine adapted in use when operating on a computer processor, to make a ZPath query of the ZPath Table for a node or nodes locatable with a specified node ordinal sequence and to return index numbers for nodes satisfying the query;

and an intersection locator engine adapted in use, when operating on a computer processor, to identify a node or nodes common to the returns of the YPath and ZPath queries and to return said common nodes.

According to another aspect of the invention there is provided a computer having a computer processor, a program memory, and access to a data structure memory, the processor being adapted to run a YPath and ZPath query of a data structure held on said data structure memory using YPath and ZPath query engine and intersection determining software held in said program memory; and the computer processor being adapted to run document parsing software held on said program memory adapted to parse a document and create and store a Document Order List, a YPath Table and a ZPath Table representative of said document in said data structure memory;

said Document Order List comprising a concordance between (i) each node in the document and (ii) an associated unique index number;

said YPath Table comprising a concordance between (i) each possible node name sequence traversable in the document when parsing it and (ii) index numbers corresponding to nodes locatable using each node name sequence;

said ZPath Table comprising a concordance between (i) ordinal numbers of each possible node path in said document to each node in said document and (ii) index numbers representative of nodes locatable using each ordinal number sequence;

said YPath query engine being adapted to return index numbers corresponding to nodes for which a specified queried node name sequence is true;

said ZPath query engine being adapted to return index numbers corresponding to nodes for which a specified queried ordinal number sequence is true;

said intersection determining software being adapted to identify intersection index numbers present in both the YPath and ZPath query engine returns and to output nodes determined by said intersection index numbers;

said processor being capable of parsing a document to create a document order list, YPath Table, and ZPath Table corresponding to said document and also to query said Document Order List, YPath Table and ZPath Table to retrieve a response to its query.

According to another aspect of the invention there is provided a computer having a computer processor, a program memory, and a data structure memory, the processor being adapted to run a YPath and ZPath query of a data structure representative of an XML document held on said data structure memory using YPath and ZPath query engine and intersection determining software held in said program memory; and the computer processor being adapted to run document parsing software held on said program memory adapted to parse an XML document and create and store a Document Order List, a YPath Table and a ZPath Table derived from said XML document in said data structure memory;

said Document Order List comprising a concordance between (i) each node in the XML document and (ii) an associated unique index number;

said YPath Table comprising a concordance between (i) each possible node name sequence traversable in the XML document when parsing it and (ii) index numbers corresponding to nodes locatable using each node name sequence;

said ZPath Table comprising a concordance between (i) ordinal numbers of each possible node path in said XML document to each node in said XML document and (ii) index numbers representative of nodes locatable using each ordinal number sequence;

said YPath query engine being adapted to return index numbers corresponding to nodes for which a specified queried node name sequence is true;

said ZPath query engine being adapted to return index numbers corresponding to nodes for which a specified queried ordinal number sequence is true;

said intersection determining software being adapted to identify intersection index numbers present in both the YPath and ZPath query engine returns and to output nodes determined by said intersection index numbers;

said processor being capable of parsing a document to create a document order list, YPath Table, and ZPath Table corresponding to said document and also to query said Document Order List, YPath Table and ZPath Table to retrieve a response to its query.

According to another aspect of the invention there is provided a computer having a computer processing means, YPath query means, ZPath query means, intersection determining means, document parsing means and data structure means, the processing means being adapted to operate the YPath and ZPath query means to query the data structure means and to operate the intersection determining means; and the computer processing means also being adapted to operate the document parsing means to parse a document and create and store a Document Order List, a YPath Table and a ZPath Table representative of said document in said data structure means;

said Document Order List comprising a concordance between (i) each node in the document and (ii) an associated unique index number;

said YPath Table comprising a concordance between (i) each possible node name sequence traversable in the document when parsing it and (ii) index numbers corresponding to nodes locatable using each node name sequence;

said ZPath Table comprising a concordance between (i) ordinal numbers of each possible node path in said document to each node in said document and (ii) index numbers representative of nodes locatable using each ordinal number sequence;

said YPath query means being adapted to return index numbers corresponding to nodes for which a specified queried node name sequence is true;

said ZPath query means being adapted to return index numbers corresponding to nodes for which a specified queried ordinal number sequence is true;

said intersection determining means being adapted to identify intersection index numbers present in both the YPath and ZPath query means returns and to output nodes determined by said intersection index numbers;

said processing means being capable of parsing a document to create a Document Order List, YPath Table, and ZPath Table corresponding to said document and also to query said Document Order List, YPath Table and ZPath Table to retrieve a response to its query.

In many embodiments of the present invention an XPath Query is converted into a set of queries on the underlying YPath and ZPath tables. The results of the separate YPath and ZPath queries may in many cases require further processing to compute the XPath query result. The query result is a single or set of integers or nothing if the query does not match any fragment of the XML document. The integers are equivalent to returning a node or set of nodes. The integers can be used in conjunction with the DOL to identify the type and value of the nodes. The integers are effectively a proxy for the nodes.

It will be appreciated that by "document" may be meant not only a text document such as sentences, or lists of words (e.g. an address list or parts list) but also documents representative of numbers, or other information, perhaps not even alpha-numeric information. Software itself may comprise a document.

BRIEF DESCRIPTION OF THE DRAWINGS

Embodiments of the invention will now be described by way of example only, with reference to the accompanying drawings of which:—

FIG. 3 shows a Document Order List, or DOL, for the document of FIG. 2;

FIG. 4 shows a table of nodes, or YPath Table, derived from the document of FIG. 2;

FIG. 5 shows a table of ordered sequences of ordinals for nodes, or ZPath Table, derived from the document of FIG. 2;

FIGS. 12 to 16 schematically illustrate a method of finding a common integer in two lists;

Appendix A shows code to implement a method of finding a common integer in two lists.

DETAILED DESCRIPTION OF THE DRAWINGS

Figure 1:
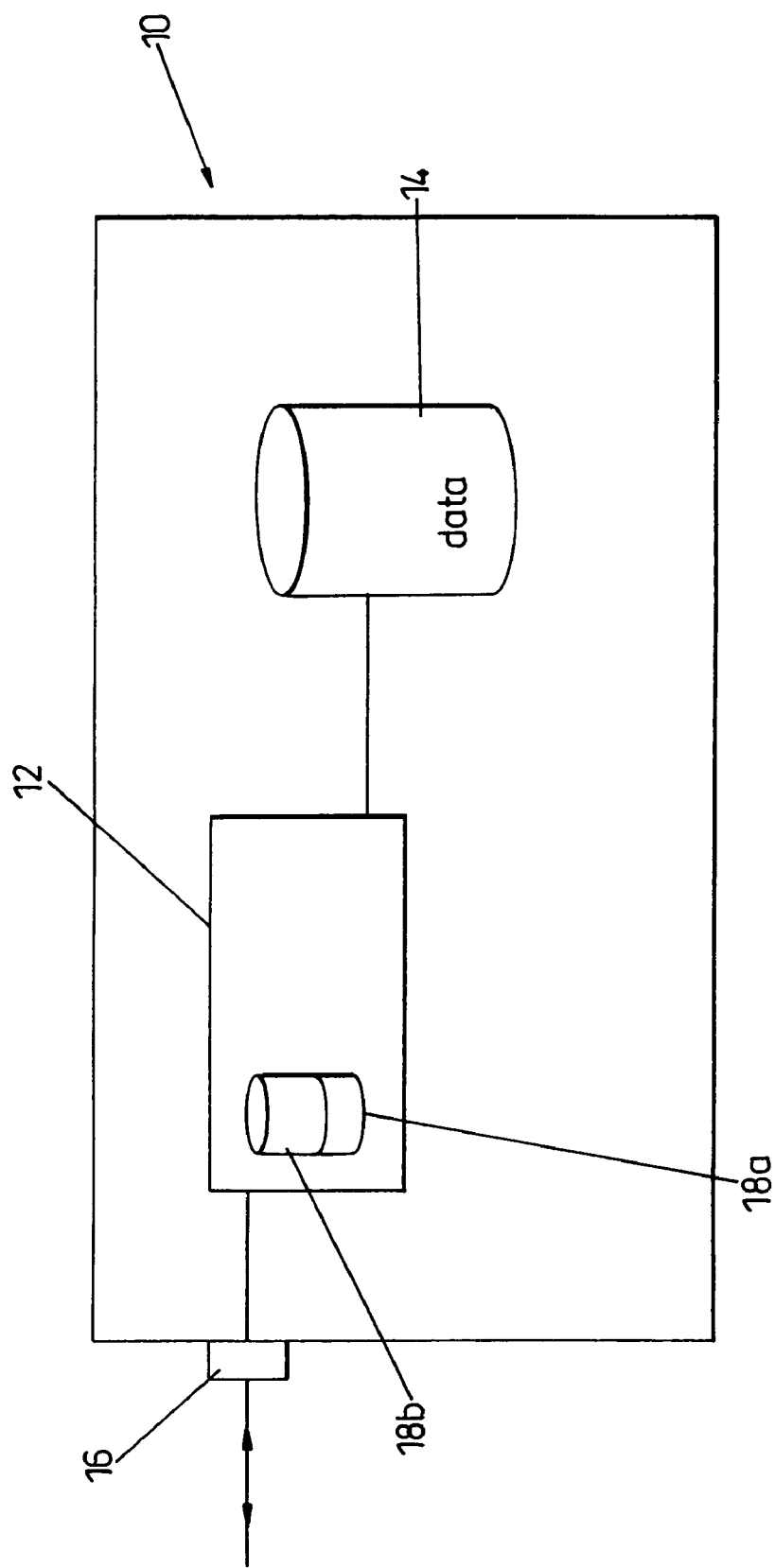
FIG. 1 shows schematically a computer having XML document parsing software and XML document query software running on it.

FIG. 1 shows a microprocessor device 10 (eg. A PC, or laptop, palm top, PDA etc), or a mobile telephone, or other document creating or receiving device. The device has a microprocessor 12, memory 14, a telecommunications port 16 (eg. A network port or a wireless telecoms link), and XML document parsing software 18a and querying software 18b running on the processor 12. The memory 14 could be external of the device 10.

Figure 2:
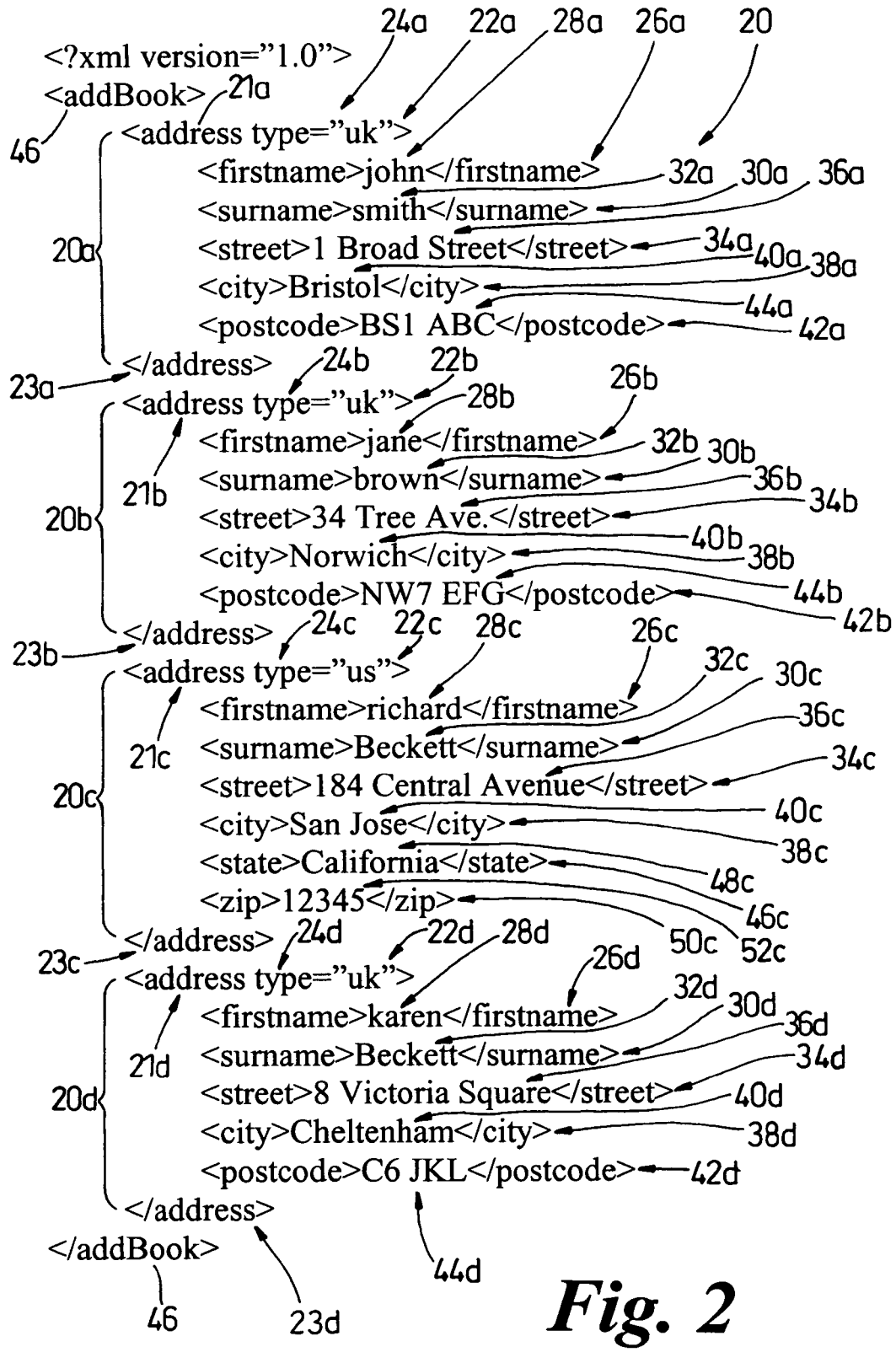
FIG. 2 shows an example XML document.

FIG. 2 shows an address list 20 having, in this example, four address nodes, or addresses 20a, 20b, 20c, 20d. In real use the address list may have hundreds or thousands, or more, of addresses. Each address node 20a–20d has a start tag 22a–22d and an end tag 23a to 23d, with a string 24a–24d within the start tag of:

Address type="UK" (only 22a, 22b, 24a and 24b are referenced in FIG. 2).

Subsidiary to the address type nodes 20a, there are five child nodes:

26a to d comprising: first name nodes, with text nodes containing strings 28a to d within the first name nodes representing the first names john, jane, richard and karen respectively);

surname nodes 30*a*to *d* with text nodes containing strings 32*a* to 32*d* within the surname nodes 30*a*to 30*d* representing surnames (smith, brown, beckett and beckett respectively);

street names 34*a* to *d*, with text nodes containing strings 36*a* to *d* within the street name nodes representing street addresses (1 Broad Street, 34 Tree Avenue, 184 Central Avenue, and 8 Victoria Square respectively);

city nodes 38*a* to *d*, with text nodes containing strings 40*a* to *d* within the city nodes representing city names (Bristol, Norwich, San Jose and Cheltenham respectively);

postcode nodes 42*a*, 42*b* and 42*d*, with text nodes containing strings 44*a*, 44*b*, and 44*d* within the postcode nodes representing postcodes (BS1 ABC, NW7 EFG, and C6 JKL respectively);

state nodes (only one) 46*c*, with a text node containing string 48*c* within it representing the name of the state of the address (California); and zip code nodes (only one) 50*c*, with a text node containing string 52*c* within it representing the zip code of the address (12345).

It will be noted that there is also node 46, with a start and end tag and the name addBook. This is a higher level node to which the addresses 20*a* to 20*d* are children nodes, and for this example is the root node.

FIG. 3 shows a Document Order List (DOL) 60, created by software 18*a* when software 18*a* parses the document 20 (the address list).

The list 60 has 4 columns: index number column 62 representing a unique index number 62*a* associated which each entry in the table/list 60; a type column 64 associated with each entry in the table/list 60 and being representative of the type of entry 64*a*, for example E for element of a node, A for attribute of a node and T for text within a text node; name column 66 having entries for the name 66*a* of a node, there being entries in the Table for all nodes, but not every index number is associated with a name node (eg. Index numbers 4, 6, 8, are not: they are associated with the text node content of a string within a name node); and a value column 68 having text node values 66*a* of text strings within text nodes.

Each text node value entry 68*a* has its own index number 62*a*, which does not correspond with any node name entry 66*a*, and each node name 66*a* has its own index number 62*a* which does not correspond to any text node value entry 68*a*.

Each node name and text node value entry, 66*a* and 68*a*, has a type and index number, 64*a* and 62*a* associated with it. E is for element type of node. T is for text type of node. A is for attribute type of node. It will be noted that Attributes do have both a node name and a value (e.g. index numbers 2, 14, 26, 40).

FIG. 4 shows a hash table 70, termed a YPath Table, which uses a node name sequence as a key into the hash table 72, comprising the sequence of node names that it is possible to traverse when parsing the document of FIG. 2 to reach any node in that document: node name location path sequences. These are listed in column 72 which comprises a node name sequence listing (location path sequences with sequence of node name encountered, but no ordinal values for the node names encountered). The place or places in the DOL 60 of address list 20 at which the entries in column 72 are true are listed in column 74 by listing the index number 62*a* at which the node name with that node name sequence can be found.

For example, the first line, line 76 of the YPath Table shows the node name addBook, 46 in FIG. 2, can be found at index number 0 in the DOL and has an entry of 0 in column 74 of FIG. 4. It cannot be found elsewhere in the document 20, and so there is only one entry for it in the DOL and only one index number associated with it. <addBook> is the root node of the document.

The second line of the YPath Table 70, line 78, has the node name sequence addBook\address type, where the node name address appears as a child node to the node name addBook, referenced as 21*a* in FIG. 2.

Nodes with the name "Address" as child nodes of the node with the name "addbook" appear four times in document 20 (referenced as 21*a*, 21*b*, 21*c*, 21*d*) and have four separate index numbers (1, 13, 25, 39), each of which is associated with the entry in the YPath Table with the relevant node name sequence location path/node name sequence.

The third line, line 80, of the YPath Table 70 shows the entry for node 22*a* in FIG. 2, the location path (by node name only, with no ordinals) where the node with name "type" is a child of the node with name address, which is of a child of addBook. <address type=" "> appears at entry 22*a*, 22*b*, 22*c* and 22*d* in document 20, and accordingly appears in the DOL four times as entries with index numbers 2, 14, 26 and 40. These index numbers are associated with the node name sequence route addBook\address\@type in the YPath Table 70, in column 74.

Line 82 shows the next node name encountered in a depth first parse of document 20: addBook\address\firstname. Nodes with this node name sequence pathway appear as references 26*a* to 26*d* in FIG. 2, and each appearance in the document 20 generates an entry in the DOL 60, entries with index numbers 3, 15, 27 and 41. These index numbers are associated with the relevant node name sequence entry in column 74 of the YPath Table.

The next, depth first, node name sequence encountered in the document 20 is addBook\address\firstname\text. This is line 84 of the YPath Table. Text, as a text node string within the node firstname, which firstname node is a child of the node address, which itself is a child node of the node addBook, appears as reference numbers 28*a* to 28*d* of FIG. 2, and accordingly entries representative of each occurrence of that node name sequence, or node name pathway, appear in the DOL 60 at index numbers 4, 15, 28 and 42. These index numbers are associated with that node name sequence.

In the YPath Table, at line 84, the location route, by node name sequence only, is in column 72 and the places in the DOL 60 where that route is true is listed in column 74.

Line 86 of the YPath Table shows the location path of the node name sequences encountered of addBook\address\surname, which appears in FIG. 2 four times with reference numbers 30*a* to 30*d*. These entries in the document 20 generate entries at index numbers 5, 17, 29 and 43 in the DOL 60, and so the YPath Table has associated with that particular node name sequence location path the index numbers corresponding to where it is true in the DOL (i.e. 5, 17, 29 and 43). Line 88 of the YPath Table shows the node name sequence addBook\address\surname\text and, in column 74, has associated with that node name sequence the index numbers 6, 18, 30 and 44 where that specific node name address sequence is true—i.e. the nodes that can be reached if that sequence is followed when parsing the document starting from the root node. It goes to specify the text node Smith, reference 32*a*, the text node Brown reference 32*b*, the text node Beckett reference 32*c* and the text node Beckett reference 32*d*.

Line 90 of the YPath Table shows the node name sequence location path addBook\address\street, and associated with that sequence of node names is the list of index numbers in the DOL where that node name sequence is true, namely 7, 19, 31 and 45. These index numbers represent the node street, reference 66*a* in FIG. 3, and other nodes with the name street in the document.

Line 92 of the YPath Table, in column 72, shows the node name sequence addBook\address\street\text, and associated with it are the locations in the DOL where it can be found, in the index numbers 8, 20, 32 and 46. These represent the text nodes 1 Broad Street, reference 36*a*, 34 Tree Avenue, reference 36*b*, 184 Central Avenue, reference 36*c*, and 8 Victoria Square, reference 36*d*.

Line 94 of the YPath Table represents the node name sequence location path addBook\address\city, and associated with that in column 70 of the index numbers 9, 21, 33 and 47. These represent the nodes 40*a*, 40*b*, 40*c*, and 40*d* in FIG. 2 where that node name location path is true.

Line 96 of the YPath Table represents the node name sequence addBook\address\city\text, and the associated index numbers where this is true in the document, namely 10, 22, 34, 48. These index numbers represent the text nodes Bristol, referenced 40*a*, Norwich, referenced 40*b*, San Jose, referenced 40*c*, and Cheltenham, referenced 40*d*.

Line 98 of the YPath Table represents the node name sequence addBook\address\post code, and the associated index numbers 11, 23 and 49 where that particular sequence of node names, starting from the root node, are true. These represent nodes 42*a*, 42*b*, and 42*d* of FIG. 2.

Line 100 of the YPath Table represents the node name sequence addBook\address\postcode\text, and the index numbers associated with that particular sequence of node names where that sequence of node names is true, namely index numbers 12, 24, and 50. These represent BS1, ABC, referenced 44*a*, NW7 EFG referenced 44*b*, and C6 JKL, referenced 44*d*.

Line 102 of the YPath Table shows the node name sequence addBook\address\state, and the single entry in the DOL where it occurs, at index number 35. This is the node referenced 46*c* in FIG. 2.

Line 104 of the YPath Table shows the node name sequence addBook\address\state\text, and a single occurrence in the document when that occurs, identified by the index number allocated to that node, namely index number 36. This corresponds to California, referenced 48*c*, in FIG. 2.

Line 106 of the YPath Table is the entry corresponding to the node name sequence addBook\address\zip, and the places where this occurs in the document, in this example it appears only once. The index number 37 is associated with that particular node name sequence location path, and the node associated with index number 37 in the DOL is the node 50*c* in FIG. 2.

Entry 108 of the YPath Table is the text node child of the node 50*c*, having the node name sequence addBook\address\zip\text, which is associated in the YPath Table with index number 38. This is, in the DOL, associated with the text node 12345, referenced 52*c* in FIG. 2.

Referring now to FIG. 5, there is also another hash table 110 created by the software 18*a*, termed a ZPath Table. The key to the hash table is the sequence of ordinals associated with node names of a location path to traverse the document to reach particular nodes, which sequence is associated with the index number in the DOL 60 at which a path with the recited ordinal sequence is true.

For example, the first ordinal encountered, for nodes that are not children of other nodes, is that associated with the addBook entry in document 20, referenced by numeral 46 in FIG. 2.

The ZPath Table 110 has two columns: an Ordinal Sequence Location Path column 112 and an associated Index Number column 114. The first line, line 116, of the ZPath Table has an entry "1" in column 112 representing the occurrences of nodes which are not children of other nodes, and the entry "0" in column 114 representing the index number in the DOL 20 at which an entry in the document 20 satisfies that condition, Index No. 0 of the DOL being associated with <addBook>, referred 46 in FIG. 2.

The second line, line 118, of the ZPath Table has an entry 1/1 in column 112. The first character "1" in the character string "1/1" represents as previously, the first occurrence of nodes which are not children of other nodes; the second character, after the "/" character representing the first occurrence of a node child of the first node <addBook>, that is to say entry 24*a* in FIG. 2, <address>, and there is the entry "1" in column 114, associating index number 1 with the ordinal sequence location path 1/1.

In line 120 of the ZPath Table character string "1/2" represents the second occurrence of a child node of the first node <addBook>, ie. the second entry for the node "address" in the document 20, referenced 22*b* in FIG. 2. This entry in document 20 has been given index number 13 by the software 18*a*, and is shown at index number 13 in the DOL. The index number 13 is associated with ordinal location path 1/2 in column 114 of the ZPath Table. It is the only place in document 20 where 1/2 is true for its ordinals.

Similarly for lines 122 and 124 of the ZPath Table, the third child of the first node, the node "address", of address 20*c*, with node name sequence ordinal sequence 1/3 in document 20 has been given index number 25, and index number 25 is associated with 1/3 in column 114.

The fourth child node 1/4, of document 20 (address, referenced 22*d* of address 20*d* of FIG. 2) has been given index number 39 in the DOL, and that associated index number is in column 114 associated with the entry 1/4 in column 112.

Line 126 of the ZPath Table represents those places in the document 20 where there are children of the first child of the first node <addBook>, the first child being <address> 20*a*.

These occurrences are: <address type>, reference 24*a*; <firstname>, reference 26*a*; <surname>, reference 30*a*; <street>, reference 34*a*; <city>, reference 38*a*; <postcode>, reference 42*a*. In the DOL those nodes have been given index numbers 2, 3, 5, 7, 9 and 11 respectively, and those index numbers, associated with entries with DOL for which the condition 1/1/1 is true, are associated in column 114 with the ordinal location path condition 1/1/1 in column 112.

Line 128 of the ZPath Table represents children of the second child of the first node <addBook>. The second child of the first node is the second address 20*b*. The children nodes of that child node are: <address type>, referenced 24*b* and given index number 14; <firstname>, referenced 26*b* and given index number 15; <surname>, referenced 30*b* and given index number 17; <street>, referenced 34*b* and given index number 19; <city>, referenced 38*b* and given index number 21; and <postcode>, referenced 42*b* and given index number 23. The index numbers relating to the nodes for which 1/2/1 is correct, i.e. index numbers 14, 15, 17, 19, 21 and 23, are listed in column 114, associated with the ordinal-only condition/location path 1/2/1 in column 112.

Line 130 of the ZPath Table has in column 112 the ordinal sequence location path 1/3/1, representing the nodes where the node name is the first child of the third node name of the root node, and the node name sequence location path where this is true, or more correctly the nodes at the end of those location sequence paths where this is true, are listed in column 114, namely 26, 27, 29, 31, 33, 35, 36 the attribute type reference 22*c* of FIG. 2, third address node, depending from the root node <addBook>; direct child nodes from that node 22*c*, namely nodes 26*c*, 30*c*, 34*c*, 38*c*, 46*c*, and 50*c*.

Line 132 of FIG. 5 ordinal sequence 1/4/1, that is the places in the node name sequences in the document for FIG. 2, where the parser is looking at the children of the fourth occurrence of the children of the root node—i.e. the children nodes in the address 20*d*. The places in the DOL where this is true are identified using the index numbers associated with the nodes that are the children of the fourth child of the root node, namely index numbers 40, 41, 43, 45, 47 and 49.

Line 134 moves down to the fourth generation children nodes, depth first ordering of the entries in the ZPath Table, and shows the index numbers associated with the nodes for which the ordinal sequence of the node name location path is 1/1/1/1—i.e. the children of the first child that is itself the first child of the root node, namely the text nodes in address 20*a*, text nodes john, reference 28*a*, smith, reference 32*a*, Broad Street, reference 36*a*, Bristol, reference 40*a*, and BS1 ABC, reference 44*a*. The appropriate index numbers for those nodes are listed in column 1110 of the ZPath Table associated with the ordinal sequence 1/1/1/1.

Line 136 of FIG. 5 indicates the index numbers, in column 110 of the nodes for which the ordinal sequence of the node name sequence to reach those nodes is 1/2/1/1—i.e. those nodes that are the child of the first child of the second child node derived from the root node (the text nodes of the second address 20*b*, namely Jane, referenced 28*b*, Brown, referenced 32*b*, 34 Tree Avenue, referenced 34*b*, Norwich, referenced 40*b*, and NW7 EFG, referenced 44*b*.

Line 138 of the ZPath Table shows the index numbers, in column 1110, of the nodes for which the ordinal sequence in the node name path is 1/3/1/1: the nodes that are the first child of the first child of the third child from the root node. That is to say, the text nodes of the third address 20*c*, namely Richard, reference 28*c*, Beckett, reference 32*c*, 184 Central Avenue, reference 34*c*, San Jose, reference 40*c*, California reference 46*c*, and 12345, reference 50*c*.

Line 140 of the ZPath Table shows the index numbers associated with the nodes where the ordinal sequence of the node name sequence traversed to reach those nodes in the document 20 is 1/4/1/1—the first child of the first child of the fourth child of the root node. Those index numbers are 42, 44, 46, 48 and 50 corresponding to the text nodes of the fourth address 20*d* in FIG. 2, namely Karen, reference 28*d*, Beckett, reference 32*d*, 8 Victoria Square, reference 34*d*, Cheltenham, reference 38*d*, and C6 JKL, reference 44*d*.

Thus, generally, to recap, the parser software 18*a* reads documents received by the computer and creates a DOL, YPath Table and ZPath Table for them. XML documents received by the device 10 from file or bytestream via the port 16 are parsed by the software 18*a*, possibly using a SAX parser, to create an array or linked list, referred to as a Document Order List (DOL), hashtables referred to as a YPath Table, and a ZPath Table (discussed in relation to FIGS. 2 to 5). Each node in a document will appear in the DOL, in depth order. Each node appears only once in the YPath Table, with an associated indication of the positions in the DOL that that node occurs. Each ordinal sequence for nodes in the document appears only once in the ZPath Table, with an associated indication of the positions in the DOL at which the nodes having that ordinal sequence appear.

Thus multinode queries are possible which return more than one node. In such cases the query is typically more general. For example, to match all children of a particular node, we can identify the index of the parent node and the index of the next sibling node of the parent. All nodes in between are the children nodes. The document structure is well suited to queries for all elements matching A\B\C. All matching nodes are available immediately from the YPaths array.

To speed up searching for nodes where there are many children, it is possible to exploit the known structure of a document. For example if looking for a node with ZPath 1/1/100/1000 we can find a good starting point by observing that the index of the node must be at position 1100 at least within the ZPath array. This is because if all predecessors contain just one child element then there are at least 99 siblings that come before the node's parent. In addition the node is itself the $1000^{th}$ child in its sibling group. To generalise, a good starting point for a search for a node can be obtained by adding the values for each individual ordinal element in the ZPath component of the XPath expression for the desired node. Any nodes with a unique index number less than this starting point could not possibly be the desired node, even if all preceding nodes only has one child element each.

In response to a query to find and retrieve a node or nodes having a specific node name sequence it is necessary only for the query software 18*b* to query the YPath Table and retrieve all nodes listed in the DOL associated with the node specified node name sequence. The response to a query will be the group of indices in the DOL for which the sought node or nodes in sequence is true.

Due to the structure of the way the document is represented (e.g. as a YPath Table), some kinds of query are facilitated (e.g. queries to return nodes with a particular node name sequence).

In order to query the XML document for all nodes in the document having a specific node name ordinal sequence it is necessary only to query the ZPath Table and retrieve entries in the DOL associated with the specified sequence of ordinals. The response to the query will be the group of indices in the DOL for which the sought ordinal or sequence of ordinals is true. Alternatively, a query seeking the first entry (or second entry, or nth entry) of a node name sequence may be facilitated.

One type of specific query that is facilitated by the way the document is represented is to request the last node for a given node name sequence. For example, the expression A[1]/B[m]/C[position( )=last( )]/@att can be specified instead of explicitly specifying integers for every element. This type of expression requires some parsing to extract the structure and interpret the semantics of the XPath expression. The indexing structure facilitates rapid lookup.

The above approach first requires that the node identified by A[1]/B[m]/C[position( )=last( )] is located. To do this, the indexes of the nodes A[1]/B[m] and A[1]/B[m+1] (assuming both exist) are located. Assume these are B1 and B2. Then the indexes stored under the YPath A/B/C are retrieved from the YPath table. The greatest index, named C, from the indexes stored under A/B/C, which is greater than B1 and less than B2 must, by the construction of the DOL, be A[1]/B[m]/C[position( )=last( )]. Using index C as the start point, the DOL is stepped through, each node in turn up to the next element node, until an attribute node with name "att" is located. At this point the value of the attribute can be determined and then returned to the entity requesting it. If no matching attribute was found then a "no-such-node" message could be returned to the requesting entity. If the node A[1]/B[m+1] does not exist, then the index C is determined to be the greatest index from the list of indices with YPath A/B/C that is also greater than B1.

In order to query the XML document to retrieve a node with both a particular node name sequence path and a particular ordinal sequence for its occurrence, it is necessary to query the YPath Table to establish a list of positions in the DOL that have node name sequences that match the node name sequence of the sought node, and the ZPath Table to establish a list of positions in the DOL that match the requested ordinal sequence of the sought node. There will be a single common position in the DOL present in the YPath query return and the ZPath query return, the intersection of the two lists matching both the queried node name sequence and the queried ordinal sequence, and that intersection is the answer.

Thus the XML document is mapped by the parsing software as a list of occurrences of all possible node name sequences to reach all possible nodes, and where in the DOL they occur, and also as a list of all possible ordinal sequences to reach all nodes and where in the DOL they occur. This greatly simplifies some kinds of queries and yet still allows an XPath query to specify both the node name sequence and ordinal sequence and allows the appropriate node to be located and retrieved.

To query a document a user enters a query into the computer 10 and the software 18b queries the YPath Table and/or the ZPath table (usually both, depending upon the nature of the query) and returns the index number(s) that are associated with the matching nodes, which are used to obtain the matching nodes from the DOL.

For example, the query addBook/address[3]/street/text( ) is entered to the computer (possibly not by manually typing in those characters, but possibly by doing so). This requests the text that is the text node child of the node with name street that is the child of the third child node with name address, from the root node addBook.

The XPath query:
addBook/address[3]/street/text( )

entered in normal XPath query format, is broken down by the software 18b into separate YPath and ZPath queries, namely:
YPath=addBook/address/street/text( )
ZPath=1/3/1/1

From the YPath table (FIG. 4) it can be seen that the node name sequence addBook/address/street/text, line 92, has associated with it index numbers 8, 20, 32 and 46.

From the ZPath table it can be seen that the ordinal sequence query 1/3/1/1, line 138 of FIG. 5, has associated with it index numbers 28, 30, 32, 34, 36, 38.

The index number satisfying both the YPath query and the ZPath query is 32 (present in both lists of index numbers), and so the answer to the XPath query is the node corresponding to index No 32 in the DOL, namely 184 Central Avenue.

In a second example, another approach to locating the desired node relies upon the entries in the DOL, YPath Table and ZPath Table being made sequentially in an ordered list depth first as the parser parses the document 20, and upon the index numbers in the DOL being allocated sequentially in the order that nodes are encountered in the document, depth first. Because of this, the index number for the requested element addBook/address[3] is obtained by first looking up the index number integer array stored associated with the element addBook/address in the YPath Table, which is the index No. integer array (1, 13, 25,39), and because the index numbers associated with nodes are added to the index No. integer array in the order they are encountered the third one (for the [3] part of the query), index number 25, must be the required node with node name address. It then remains to find its child street with its own child text, and retrieve the text.

This approach, which relies upon some knowledge of the structure of the document 20, can be used so long as the order of the index numbers in the sequence of index numbers associated with each node name sequence in the YPath Table is sequential in the order in which nodes are encountered when parsing the document. If that is true then so long as the correct parent node is identified, then the nth child node will be equivalent to the nth entry in the sequence of index numbers for the immediate parent node.

Since a child node is always encountered after its parent node it is true that the "/street/text( )" part of the query must take the parser to a node further along the document 20, and hence having a higher index number than that for the parent node addBook/address[3] (i.e. higher than index number 25). Since the /street part of the query means that the node street, child of /address[3], itself child of /addBook, must be the first child, and hence when we look at the index number integer array associated with the node name sequence addBook/address/street/text in the YPath Table, i.e. sequence 8, 20, 32, 46, it is known that the first text node child of the node street is wanted, and that the index number for that node must be the node with the first (lowest) index number that is higher than the parent node addBook/address [3], i.e. higher than index number 25. This in the sequence 8, 20, 32, 46 is index number 32. The value of this node is looked up in the DOL and the string "184 Central Avenue" is returned.

It will be appreciated that (in the examples given) in the YPath Table the index numbers are listed in an ordered list, the ordering being the depth first order in which nodes are encountered in the document. It is therefore possible to use a knowledge of the document to find specific nodes (for example, the $4^{th}$ ordinal node of a specific node name sequence will be that of the $4^{th}$ index number in the sequence of index numbers associated with the node name sequence in the YPath Table). Similarly, the nth ordinal for a specific node name sequence will be the nth entry in the sequence of index numbers associated with that node name sequence.

Consider a second example XPath query:
addBook/address [@type=UK"]/postcode/text( )

This query calls for the text nodes (all of them) that are the children of nodes named postcode, which nodes named postcode are themselves the children of a node named address and having the attribute type=UK, in turn children of the root node addBook.

The query has no ordinal content and so it can be answered from the YPath table alone. In this case, we first look up set of indices (I1, I2) stored under addBook/address/ @type
I1=(2 14 26 40)

and under addBook/address [@type="UK"]/postcode/text( )
I2=(12 24 50). We denote the nth entry in I1 or I2 as I1(n) and I2(n).

We then begin to step through each index of I1 (m=1 . . . 4) and look up the value in the DOL at that index, called m. If it is 'UK' then we have a match and so we now require the postcode information (if any is available). To do this we find the first occurring index, n, from I2, where I2(n)>I1(m). We then look up the postcode value from the DOL under the index n. To simplify searching, after we look up the second index from I1, we remove all entries from I2 whose integer values are less than it (we know from the depth first ordering of the master table that the integers cannot possibly be matches).

Consider a third example XPath query:
addBook/address[position( )>1]/surname/text( )

In this case we look up the indices stored under addBook/address. We now look up the $2^{nd}$ index (since in the query "position( )>1") in the query which is 13. Now we look up all the indices stored under addBook/address/surname/text( ) and remove all indices less than 13. This leaves 18, 30 and 40. Finally the values for the text stored at these indices in the DOL and looked up, returning the values Brown, Beckett, Beckett.

Another example illustrates how a node is identified using the intersection of the YPath and ZPath entries.

Consider the request for the node identified by addBook[1]/address[3]/firstname[1]/text.

This requires the node that is common to both the set of integers from the YPath table identified by addBook[1]/address[3]/firstname[1]/text and the set of integers stored under the 1/3/1/1 from the ZPath table. The integers from the YPath table are 4, 15, 28, 42. The integers from the ZPath table are 28, 30, 32, 34, 36, 38.

Using a common integer algorithm, the common integer is determined to be 28. From the DOL, this is identified to be a text node, with value Richard.

Another example is a query of the form //postcode. This is interpreted to mean find all occurrences of the element with name postcode anywhere in the document. To evaluate this requires only the use of the YPath table. All the left hand entries in the YPath table are examined sequentially. If any of the YPaths has a final name postcode, then this matches the query. Therefore from table Y, there is only one entry that ends with postcode which is line 93, i.e. addBook/address/postcode. All the integers stored under this composite name match the query and are returned i.e. 11, 23 and 49.

Figure 6A:
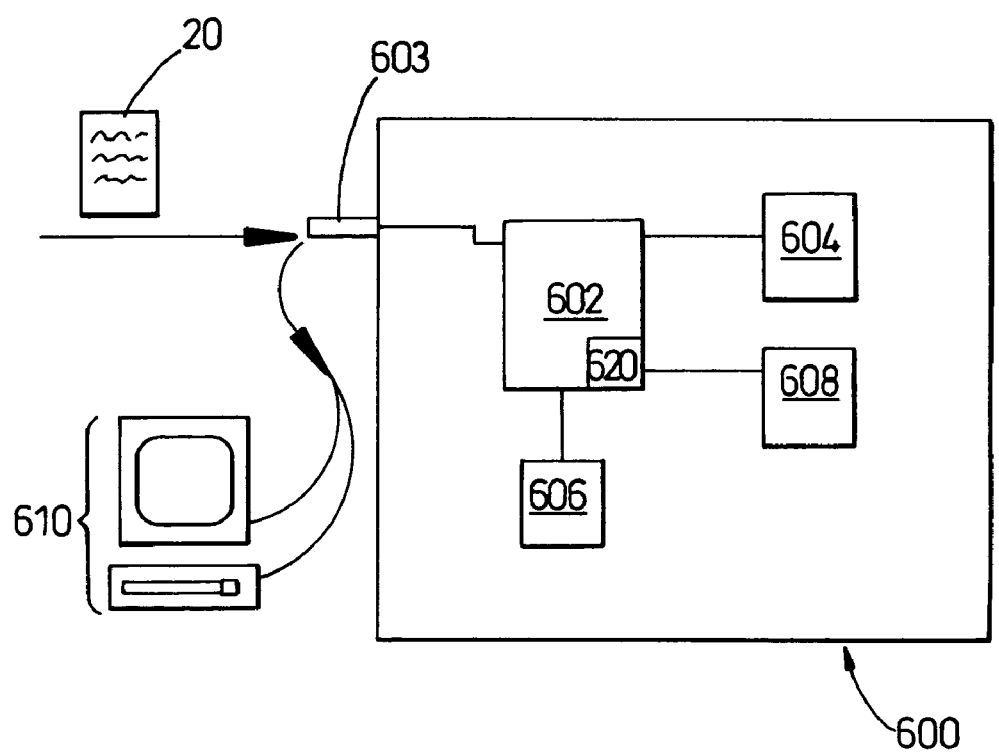
FIG. 6A shows schematically a computer programmed in accordance with an aspect of the invention.

FIG. 6 illustrates a process according to one embodiment of the present invention for receiving an XML document 20. The document is received by a computer 600, shown in FIG. 6a, having a microprocessor 602, a network port 603, a document memory 604, a software memory 606, and a data structure memory 608. Output device 610 is also shown.

The processor 602 may have an XML document 20 input to it by any suitable means including:
(i) the document may be read from a storage means, e.g. a disc input to a read head;
(ii) entered by a user, e.g. from a keyboard;
(iii) received from a transmitting means, e.g. via a network port, possibly via the internet.

Figure 6B:
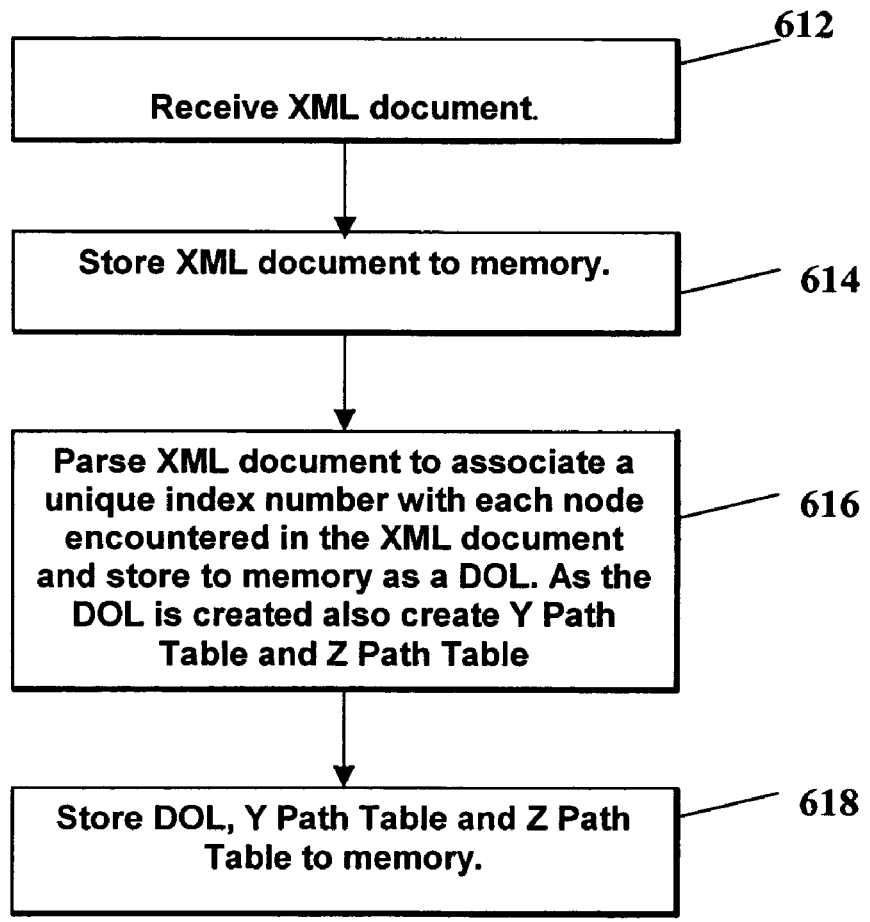
FIG. 6B is a flow chart illustrating a process which occurs in some embodiments of the invention when an XML document is received by a computer.

The processor 602 receives a new document 20, shown as step 612 in FIG. 6B and stores the XML document 20 to document memory 604 (step 614), and then parses the document (from memory 604), step 616, to build up simultaneously, or substantially at the same time, a Document Order List, a YPath Table and a ZPath Table. When the DOL, YPath Table and XPath Table are complete they are stored, step 618, to memory 606.

Whilst the DOL, XPath Table and YPath Table are being created they are held in temporary memory, typically on the processor itself, shown as memory 620.

The YPath Table and ZPath Table are created upon receipt of the XML document to save time and computing power when an XPath query is received.

The parsing software is stored in software memory 608 and is retrieved by the processor 602 and run as necessary to parse documents presented to it.

Figure 7:
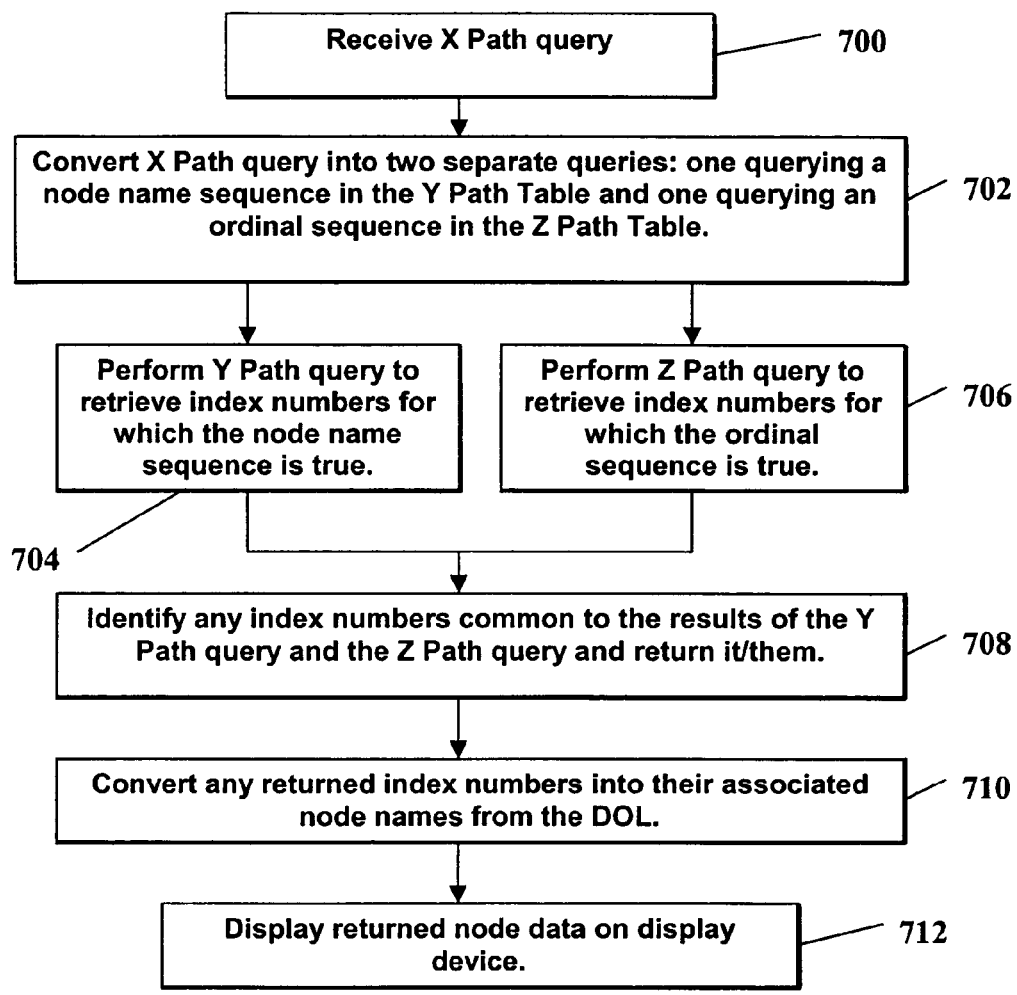
FIG. 7 is a flow chart illustrating a process which occurs in some embodiments of the invention for making an XPath query containing a node name sequence and ordinal information corresponding to the number of the node encountered in the node name sequence.

FIG. 7 illustrates a process of querying a document, or its data structure representation, according to one embodiment of the present invention for receiving an XPath query 110.

The processor 602 of FIG. 6A receives an XPath query, step 700, relating to a specific node name sequence and a certain ordinal sequence corresponding to the number of the node encountered in the node name sequence.

The YPath and ZPath Tables for the XML document to be queried are already available in memory 608 as they were created when the XML document was first received and parsed.

The XPath query is split, in step 702, into two separate queries for the YPath and ZPath Tables. The YPath query is performed on the YPath Table to retrieve index numbers for which the node name sequence specified in the XPath query is true, step 704.

The ZPath query is performed on the ZPath Table to retrieve index numbers for which the ordinal sequence corresponding to the number of the node encountered in the node name sequence specified in the XPath query is true, step 706.

The index numbers retrieved from the two queries are then compared, and any index numbers common to the results of the two queries are returned, step 708.

Any returned index numbers are then converted into their associated node names, step 710, and presented to the output device 610, step 712. A suitable output device 610 could be a display screen or a printer.

Of course, instead of outputting the returned node data on a display device it could be telecommunicated, for example over a network via an output port, such as port 603.

Figure 8:
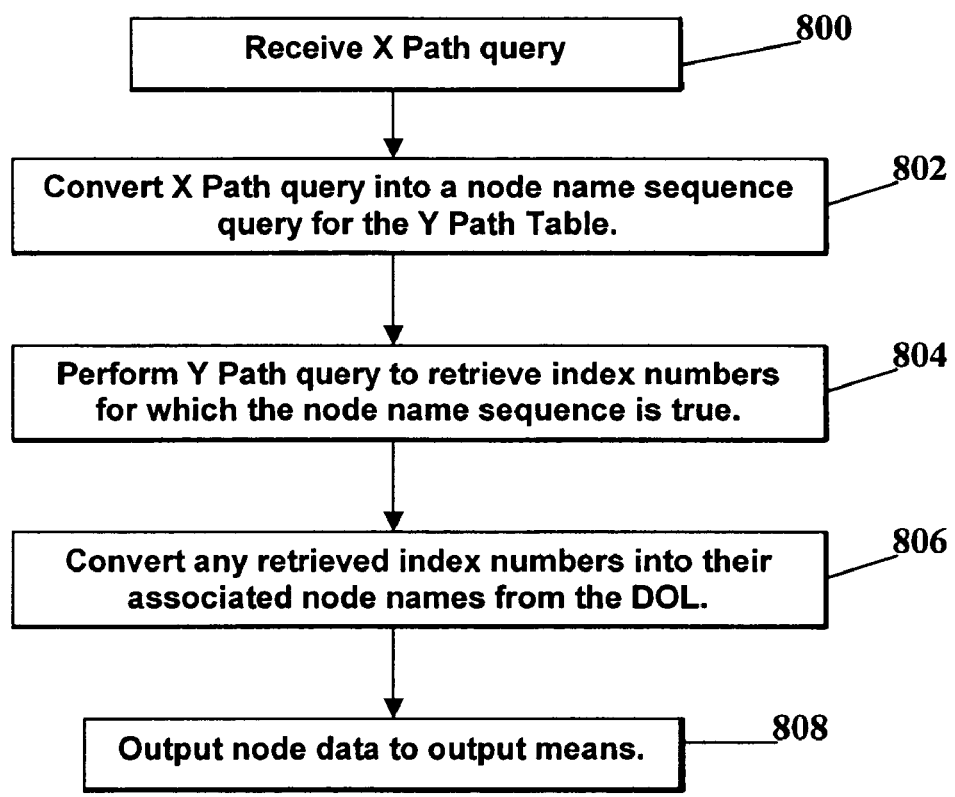
FIG. 8 is a flow chart illustrating a process which occurs in some embodiments of the invention for making an XPath query containing a node name sequence only.

FIG. 8 illustrates a process according to one embodiment of the present invention for receiving an XPath query which contains information relating to a specific node name sequence and no information relating to a specific ordinal sequence corresponding to the number of the node encountered in the node name sequence. The XPath query is received, step 800, and is converted, step 802, into its corresponding YPath query. No ZPath query is needed as the original XPath query did not contain a specific ordinal sequence. The YPath query is performed, step 804, all index numbers for which the specific node name sequence is true are retrieved. These index numbers are then converted, step 806, into their associated node names, and the equivalent node name data output, step 808, to the output means 603 or 610.

Figure 9:
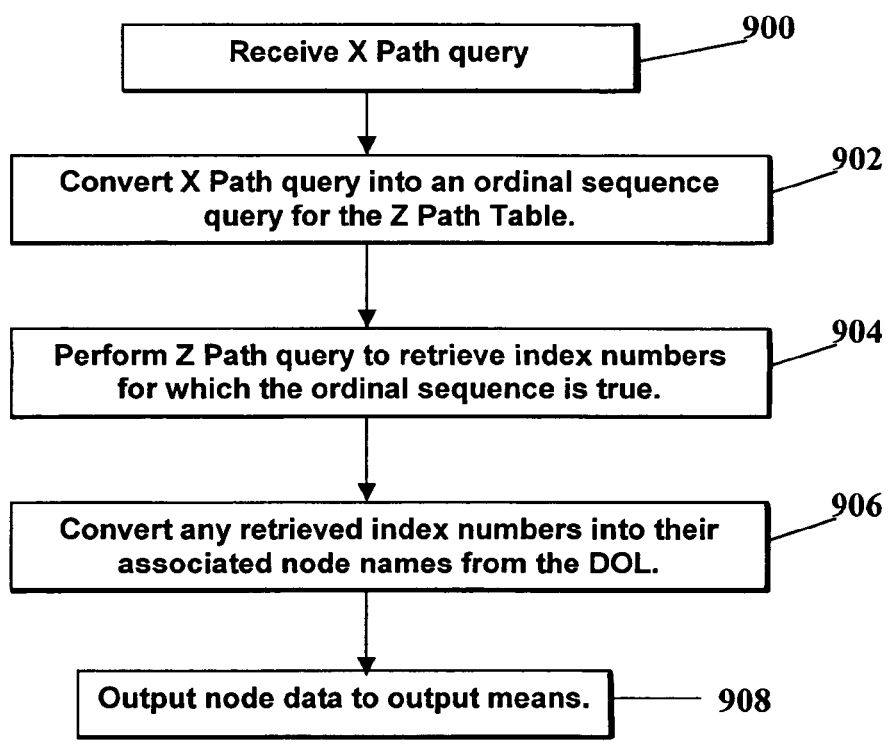
FIG. 9 is a flow chart illustrating a process which occurs in some embodiments of the invention for making an XPath query containing a sequence of ordinal numbers and no specific node names.

FIG. 9 illustrates a process according to one embodiment of the present invention for receiving an XPath query which contains a sequence of ordinal numbers with no associated specific node name information. The XPath query is received, step 900, and is converted, step 902, into its corresponding ZPath query and no YPath query is needed as the XPath query does not contain any specific node name information. The ZPath query is performed, step 904, and all index numbers for which the specific ordinal sequence is true are retrieved. These index numbers are then converted into their associated node names, step 906. The returned node data is output to the output means 610 or 603.

Figure 10:
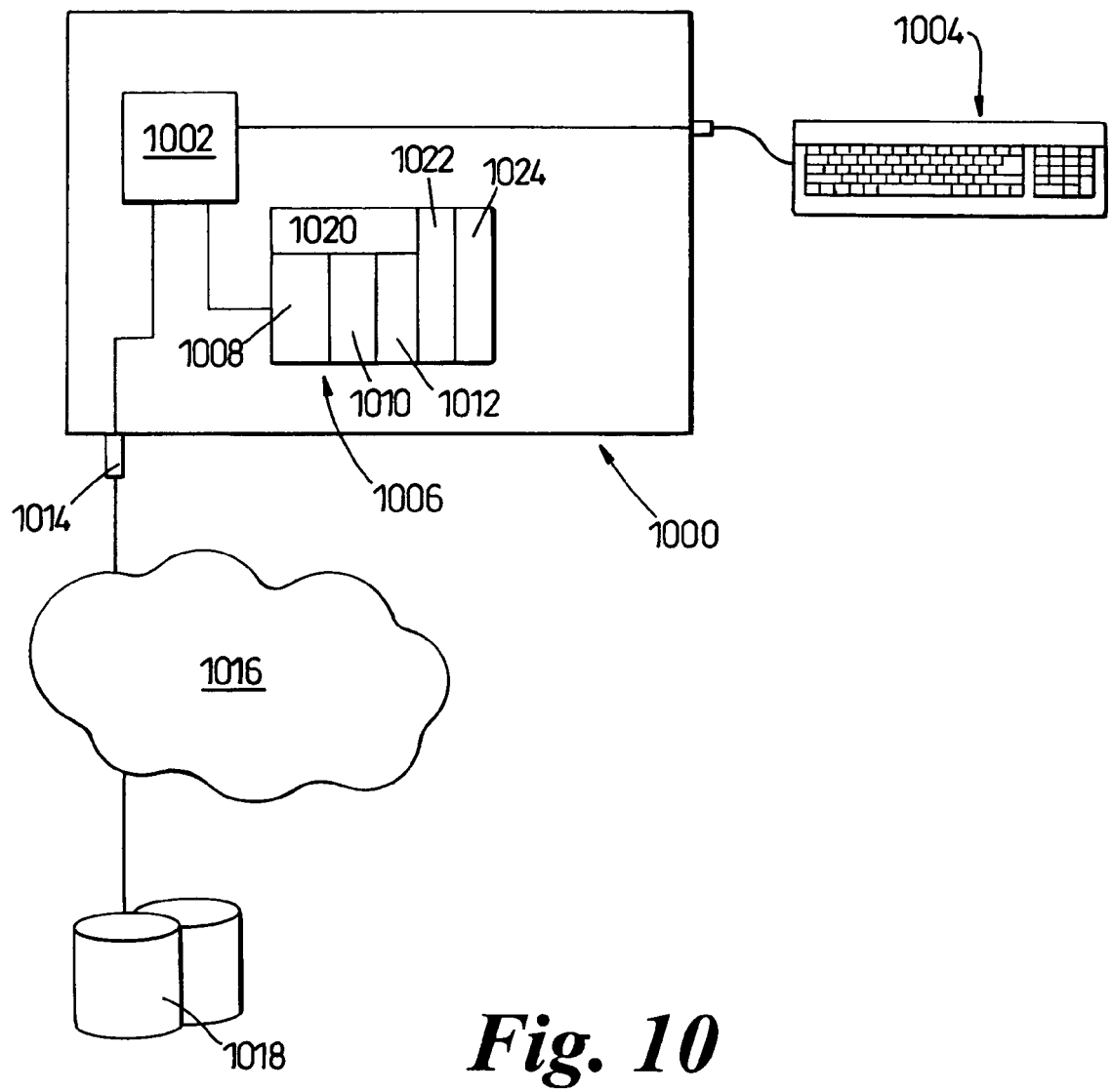
FIG. 10 shows a computer in accordance with an embodiment of the invention.

FIG. 10 shows a computer 1000, with a processor 1002, a keyboard 1004 or other manually operable input command device connected to the computer, a computer memory 1006 containing a Y Path Table portion 1008, a Z Path Table portion 1010, and a Document Order List portion 1012; a network (e.g. Internet) port 1014 linked to a network (e.g. Internet) 1016, and a document stored remotely on another media, such as a hard disc 1018 linked to the network.

Parsing software 1020 and Y Path and Z Path query software 1022 and 1024 are also in the memory 1006.

In use a remotely stored document is called down from the remote media 1018 by the computer 1000, and parsed by the parsing software 1002 to create a Y Path Table, Z Path Table and DOL for the document. A number of documents are stored in the memory 1006 in this way (as Y Path Tables, Z Path Tables and DOL's equivalent to the documents).

In some other embodiments the documents may be transferred from the remote media 1018 as a Y Path Table, Z Path Table and DOL, with the parsing software 1020 not having to parse the document (because that has already been done). This avoids having to re-parse the document at the "receiving" computer. Similarly the document can be stored as a Y Path Table, Z Path Table and a DOL.

Figure 11:
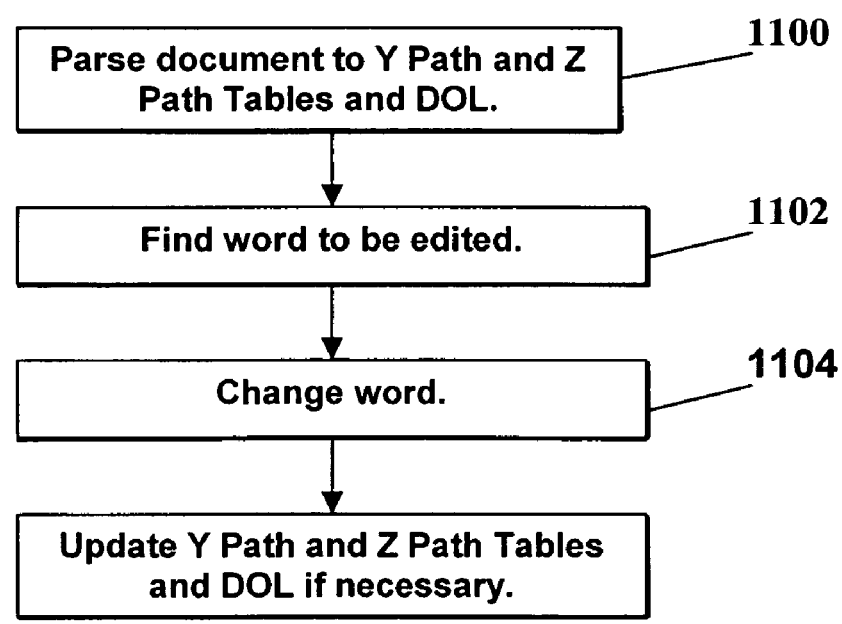
FIG. 11 shows a process for editing a document in accordance with an embodiment of the invention.

FIG. 11 shows a method of editing a document using the apparatus of FIG. 10. The document is resolved into an equivalent Y Path Table, Z Path Table and DOL, step 1100. This may be done by the computer 1000, or upstream of it.

A word, or phrase, to be edited is keyed in via the keyboard 1004 and found in the DOL, step 1102. The word is changed in the DOL, step 1104, and the Y Path and Z Path Tables may be updated if necessary. If the editing is simply replacing node text with different node text, the new node text not being represented elsewhere in the DOL, the Y Path Table and Z Path Table may not need updating; changing the text in the DOL associated with the or each index number concerned may be enough. Sometimes the Y Path and Z Path Tables will need altering (e.g. if a node is deleted, or if a mis-spelt word is corrected to be the same as correctly spelt existing node text.

Finding Common Index Numbers in YPath Query Return and ZPath Query Return

There are many possible ways to find entries (e.g. numbers) in two lists that are common. We propose a method here which reduces computational load and facilitates finding common entries.

Figure 12:
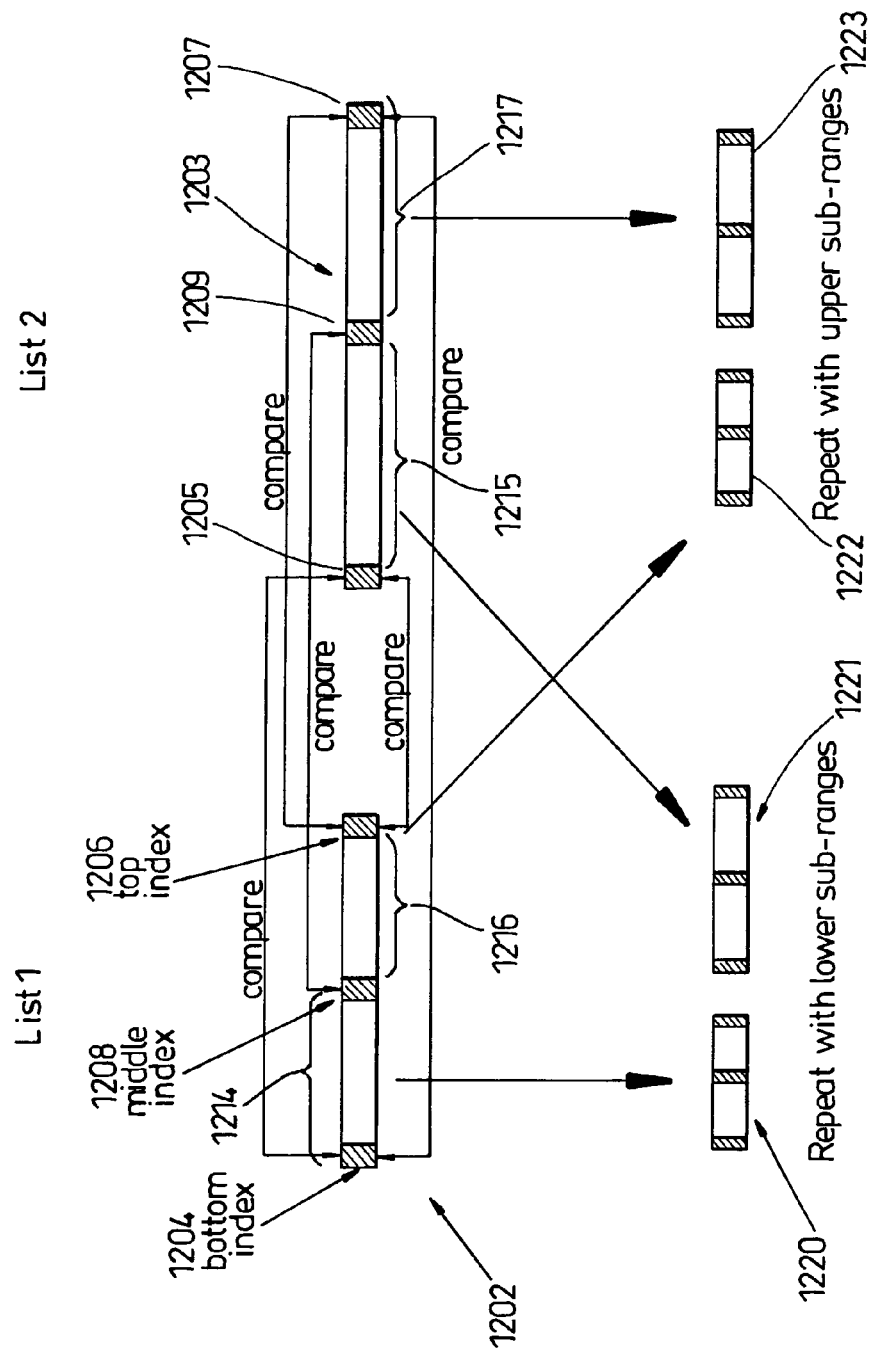
Figure 13:
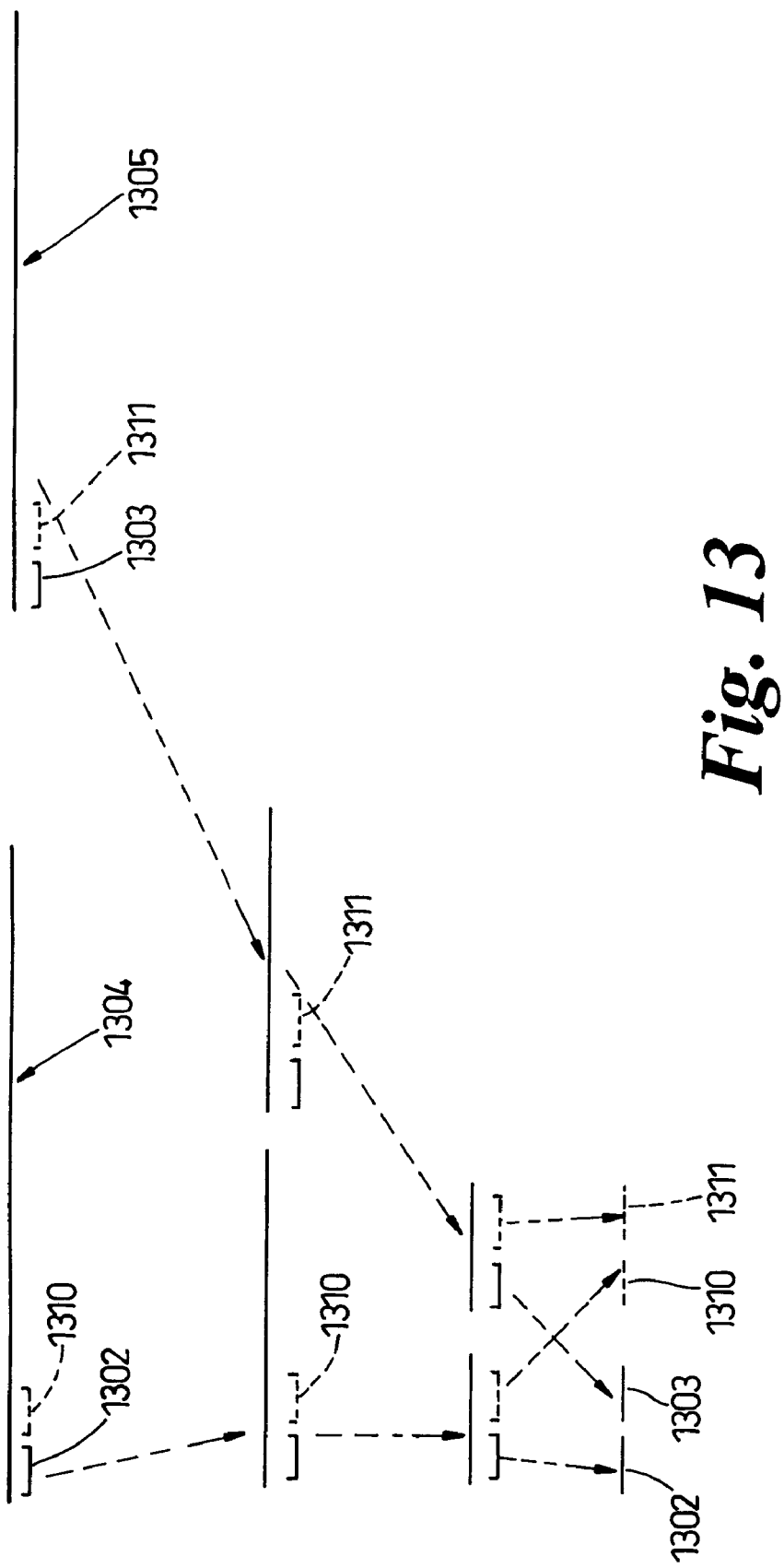

FIGS. 12 and 13, and Appendix A, demonstrate a way of determining a common entry in two lists which has advantages. It can reduce the time taken, and processing needed, to find the common entry. The technique is applicable to other situations where there are ordered lists where each entry has been ordered with respect to the other list members under some function, which enables equality between entries to be established, and where each entry can be determined to have a value "more than" or "less than" another entry. An example could be a list of words ordered according to a lexicographical function. It is especially useful for finding a single common number in two lists when it is known that there is only one entry satisfying that condition. Once the single common entry is found there is no need to do other calculations/comparisons. The technique can also find a plurality of the same matching entry in two lists, assuming the lists are ordered in an increasing sequence.

The approach to finding the common integer between two lists of ordered integers where there is known to be only one common integer is based on divide-and-conquer. Essentially, the common integer between two lists is determined by looking for the common integer in two pairs of sub lists, the first pair consisting of lower ranges of integers formed from the first and second lists and the second pair made up from the remaining upper ranges from the two starting lists. This approach is repeated until both of the lists contain only two or three entries. At that point a match will be sought and if none is found the search down the related branch will stop.

Care has to be taken to evaluate the upper and lower ranges to form the next pairings. This is to avoid missing the common integer when it lies at that index used to split the upper and lower ranges. Note that the splitting of the lists does not necessarily occur on or near the mid point of both lists, but is dependent on the value of the integers in each list.

In the method described below comparisons, in this example five comparisons, are made between the top, bottom and midpoint values in the list. If no matches are found, new ranges for each list are computed and the process is repeated for the now shorter lists, until both lists contain only two or three entries. At this point a further four comparisons are made between the midpoint values of each list and the top and bottom values of the other list, before either returning a successful match or returning that there is no match.

FIG. 12 shows substantially a first list 1202 of index numbers representing the index numbers returned from a Y Path query and a second list 1203 of index numbers representing the index numbers returned from a Z Path query. The index numbers in each list are in sequential order within the lists.

The aim is to split each index number sequence into two portions until there are only 2 or 3 index numbers in the divided up Y Path list and Z Path list, but to conduct preliminary checks before further splitting of the lists to ensure that the limits of the lists is not the integer sought. When the lists both get to 2 or 3 entries only, they only have their upper and lower limits left (and possibly the mid point). It is the case that index numbers at the lower end, referenced 1204, of list 1202 that are lower than the lowest index number at the lower end, referenced 1205, of the list 1203 cannot be the common index numbers because they are beyond the range of the list 1203. Any such index numbers in list 1202 that are smaller than the smallest index number in list 1203 are discarded since they cannot be the match. Similarly, any index numbers in list 1203 that are smaller than the smallest index number in list 1202 are discarded as not being the match.

The same process of "topping and tailing" is carried out for the upper ends of the lists, referenced 1206 and 1207: that is to say those index numbers in one list that are beyond the highest index number in the other list are discarded, and vice-versa.

This results in truncated "overlapping but registered" lists 1202 and 1203.

The next step is to find the mid point, m, in one list, say list 1202. That is to say that if the list 1202 has n index numbers, the index number that is n/2 along the list. If a fractional sequential number is evaluated as being the arithmetic mid point, the fraction is rounded, in this case down, to the nearest whole number. As an example, if there are 17 index numbers in list 1202, the mid point is the $8\frac{1}{2}^{th}$ number, rounded down to the $8^{th}$ index number in the sequence. This mid point number, m, is referenced 1208 in FIG. 12, and is the n/2 number in the sequence of index numbers of the Y Path return. The Y Path return sequence is split into two smaller lists 1214 and 1216 with equal numbers of index numbers (or one can have one more index number than the other).

When the middle index number of list 1202 is known, its value (index number) is known. The other list, the Z Path return sequence of index numbers, is to be divided into two parts, but not simply by arithmetically having equal numbers of index numbers in each part. This would risk having the common number in the wrong part. Instead the value of the middle index number from the list 1202 is taken and the list 1203 is divided at the index number in list 1203 that is equal to or next to that (referenced 1209 in FIG. 12). This ensures that if the m index number is the common index number it is included in the part of the second list 1203 that is compared with the correct part of the first list 1202.

FIG. 12 shows that the lower index number range portion, referenced 1214, of the first list is to be compared with the lower index number range portion, referenced 1215 of the second list, and the higher index number portion 1216 of the first list 1202 is to be compared with the higher index number range 1217 of the second list 1203.

This produces two pairs of smaller lists, pair 1220 and 1221 of the lower ranges of index numbers, and pair 1222 and 1223 of the higher ranges of index numbers. Each pair then treated as separate Y Path and Z Path index number sequence returns, and the process repeated.

The aim is to get the Y Path and Z Path index number sequences down to a size where they have only 2 or 3 index numbers in them, because then a match can be determined.

Before the process of topping and tailing, finding the numerical mid point of the sequence of one of the Y Path or Z Path returns, determining the value of that mid point and splitting the other of the Y Path and Z Path return index number list at a point dependent upon the value of the index number of the mid point of the other list, and producing a pair of lists of the lower range of index numbers and a pair of lists of the higher range of index numbers, checks are made to ensure that the key points in the lists are not the match.

The smallest index number in the first list is checked to ensure that it does not match the smallest in the second list, and to check that it does not match the largest in the second list (i.e. both end points of second list). The maximum index number in the first list is checked to ensure that it does not match the maximum index number of the second list, and to check that it does not match the minimum index number in the second list (i.e. both end points of second list). The mid point of the first list is checked to see if it matches the mid point of the second list (the mid point of a list of 3 index numbers is the middle one; the mid point of the list of 2 index numbers is rounded down (in this embodiment, but it may be possible always to round it up instead), and is the lower one).

FIG. 13 illustrates schematically the progressive selection of parts 1302 and 1303 from Y Path return sequence of index numbers 1304 and Z Path return of index numbers 1305, over three stages of division of the list until there are only 2 or 3 index numbers in each part 1302 and 1303.

If no match is found comparing parts 1302 and 1303 (and no match found in the end and mid point checks at each division up until these 2 or 3 index number ranges are divided out), then a check of another pair of 2 or 3 index number ranges is made, for example, 1310 and 1311. If no match there is found (or in the process of getting to that level of division), another pair of sequences of index numbers are compared. In the type of query that is looking for a single node, and where it is known that there is only a single node, the comparisons can stop once a match has been found.

FIG. 14 shows a Y Path return 1402 of index numbers and a Z Path return 1403 of index numbers. The index numbers shown are illustrative only and do not relate to index numbers for nodes in the example of FIGS. 1 to 11.

The common index number in both returns is "30", referenced 1404. The mid point m of the Y Path return is shown at dotted line 1406, and is the $7^{th}$ index number in the sequence of 15, numbered zero to 14, index number 33 (rounded down from $7\frac{1}{2}^{th}$ (15÷2)). The Z Path return 1403 has 16 index numbers (from the $0^{th}$ to 15), and the half way point is between "46" and "47", but that would exclude possibly matching index numbers, and so the value of the highest index number in the lower index number range, "33" is taken as the dividing point in the other list 1403. The nearest index number to be sure of including the midpoint "33" is wanted, and that is number "33", and so list 1403 is divided at point 1407, just below the index number for the mid point of list 1402.

Thus list 1403 is not split into two portions with an equal number of index numbers: it is split at a place dependent upon the value of the numerical mid point of the other list.

FIG. 15 shows a similar arrangement and illustrates a situation where if the list 1403 were split at the mid point assessed by number of index numbers (or just below the mid-point), point 1510, instead of at point 1507, the common index number "30" would be excluded from the correct (lower) part of the split.

Figure 16:
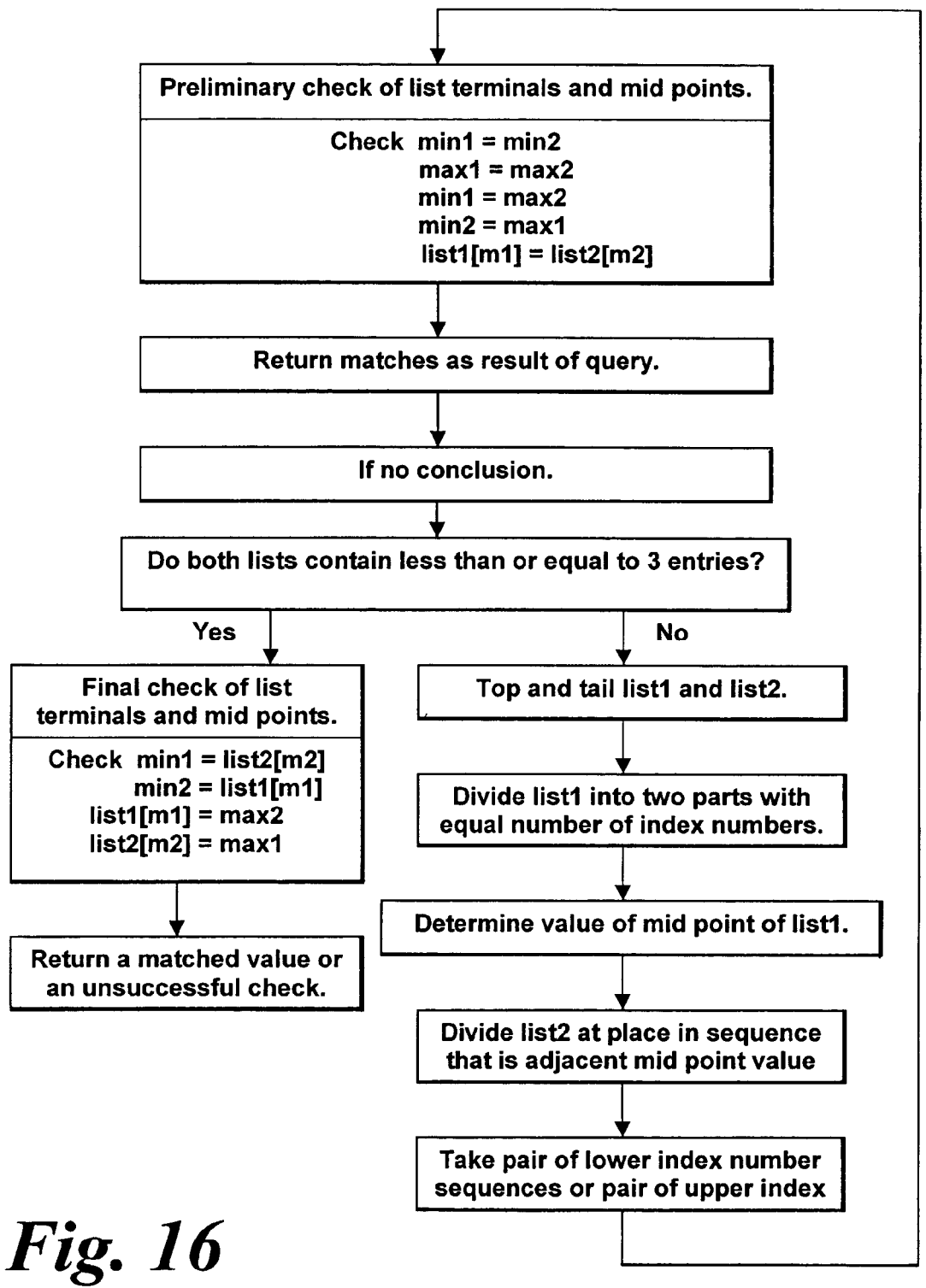

FIG. 16 illustrates the process of finding a match in the Y Path return and Z Path return as a flow diagram.

Appendix A is code, with annotations, to implement a method of finding a match between two lists of sequential numbers.

It is believed that in many embodiments it is necessary only to perform the 5 checks shown in FIG. 16 each time the lists are divided, and that time and computing power can be saved by only performing the additional four checks once both of the lists have been reduced to two or three entries.

It will be appreciated that the use of a DOL allows for what is essentially a random look-up in the document tree, rather than walking the document tree. This is faster than walking the tree. Because of this random access facility it also eliminates the need to specify a context node.

Editing documents is envisaged. Once a specific target node of interest has been identified (e.g. a word or sentence to be edited) in a document, it is possible to instruct a processor to change, replace, or delete the identified node or its content.

An API (application protocol interface) may be developed to convert XPath expressions into a pair of YPath and ZPath expressions.

A further advantage is that because a representation of each node name or element name is stored only once, the technique is memory efficient, bring associated benefits.

APPENDIX A

```
public class CommonIntSearcher {
    private int [ ] list1;      // first list of integers in ascending order
    private int [ ] list2;      // second list of integers in ascending order
    protected int num;          // ?
/**
 * Creates a new instance of CommonIntSearcher
 */
    public CommonIntSearcher( ) { }
/**
 * Finds the index of the entry in _list which is the highest
 * value just less than _value;
 */
    protected int getIndexJustBelow(int[ ] _list, int _value) {
        // t => top index
        // b => bottom index
        // m => mid point (index) between 't' and 'b'
        int t = _list.length - 1, b = 0, m = (t+b)/2;
        // loop stops when 't' and 'b' are same or adjacent indexes.
        while(t-b > 1)
        {       if(_list[m] > _value)
                {   t = m;
                }
                else
                {   b = m;
```

APPENDIX A-continued

```
            }
            m = (t+b)/2;
        }
        return b;
    }
/**
 * Finds the index of the entry in _list which is the highest
 * value just greater than _value;
 */
    protected int getIndexJustAbove(int[ ] _list, int _value) {
        // t => top index
        // b => bottom index
        // m => mid point (index) between 't' and 'b'
        int t = _list.length - 1, b = 0, m = (t+b)/2;
        // loop stops when 't' and 'b' are same or adjacent indexes.
        while(t-b > 1)
        {       if(_list[m] > _value)
                { t = m;
                }
                else
                { b = m;
                }
                m = (t+b)/2;
        }
        return t;
    }
}
/**
 * Returns the index of the common integer between list1 and list2.
 */
    public int getIndex(    int _bottom1, int _top1,
                            int _bottom2, int _top2) {
        num++;
        int b1       = _bottom1;  // 'b1' is the bottom index of list 1
        int b2       = _bottom2;  // 'b2' is the bottom index of list 2
        int t1       = _top1;     // 't1' is the top index of list 1
        int t2       = _top2;     // 't1' is the top index of list 2
        int m1, m2;               // 'm1' is the mid point of 'b1', 't1'
                                  // 'm2' is the mid point of 'b2', 't2'
        int min1     = list1[b1]; // min1 is value in list 1 at index b1
        int min2     = list2[b2]; // min2 is value in list 2 at index b2
        int max1     = list1[t1]; // max1 is value in list 1 at index t1
        int max2     = list2[t2]; // max2 is value in list 2 at index t2
        m1 = (t1 + b1) /2;        // compute mid point between b1 and t1
        m2 = (t2 + b2) /2;        // compute mid point between b2 and t2
        // check for a common integer (see figure above)
        if(min1 == min2)          return b1;
        if(max1 == max2)          return t1;
        if(min1 == max2)          return b1;
        if(min2 == max1)          return t1;
        if(list1[m1] == list2[m2]) return m1;
        // if each list length ≤ 3 & no match => no common integer so
        // finish after checking corner cases
        if(t1-b1 <= 2 && t2-b2 <= 2)
            {
                if(min1 == list2[m2])    return b1;
                if(min2 == list1[m1])    return m1;
                if(list1[m1] == max2)    return m1;
                if(list2[m2] == max1)    return t1;
                return -1;
            }
        // else bisect the range and look for common int in sub-ranges
        // this requires the top and bottom indices to be recalculated
        if(min1 > min2)
        { b2 = getIndexJustBelow(list2, min1);
        }
        else
        { b1 = getIndexJustBelow(list1, min2);
        }
        if(max1 > max2)
        { t1 = getIndexJustAbove(list1, max2);
        }
        else
        { t2 = getIndexJustAbove(list2, max1);
        }
        // compute the new mid indexes of the two sub ranges
        m1 = (b1+t1) / 2;
        m2 = getIndexJustBelow(list2, list1[m1]);
        // Now being looking for the common integer in the sub ranges.
        // look for the common integer in the first of the new sub ranges
        int index = getIndex(b1, m1-1, b2, m2);
        // if index < 0, then the common int could not have been found in
        // the previous range, so try second range.
        if(index < 0)
            index = getIndex(m1, t1, m2, t2);
        // return the integer of the location of the common integer
        return index;
    }
/**
 * Returns the common value between the two array lists if one
 * exists or it returns Integer.MAX_VALUE
 */
    public int getCommonValue(int[ ] _list1, int[ ] _list2) {
        list1       = _list1;
        list2       = _list2;
        num         = 0;
        int index = getIndex(0, list1.length-1, 0, list2.length-1);
        if(index < 0) {
            return Integer.MAX_VALUE;
        }
        else {   // the index is from list 1
            return list1[index];
        }
    }
}
```

The invention claimed is:

1. A parser for parsing documents comprising a Document Order List Creator, a YPath Table Creator, and a ZPath Table Creator;

the arrangement of the Document Order List creator being such that it is adapted to produce a Document Order List (DOL) correlating a unique index number with an associated node, and the Document Order List creator being adapted to allocate each node in a document parsed its own unique index number in the DOL;

and wherein the arrangement of the YPath Table Creator is such that it is adapted to produce a YPath Table having a set of sequences of node names representative of all sequences of node names encountered in traversing from the root node to all possible nodes in the document parsed, and associated with each sequence of node names a corresponding group of index numbers corresponding to the index numbers in the DOL for those nodes in the DOL for which the associated sequence of node names is true for a traversed pathway from the root node to the specified node, each node name sequence encounterable in parsing from the root node to any other node in the document appearing only once in the YPath Table; and wherein the arrangement of the ZPath Table Creator is adapted to create a ZPath Table having a set of sequences of ordinals representative of ordinals of those nodes encounterable in traversing from the root node to all possible nodes in the document, the ordinal of a node being the integer value position of the node amongst those nodes of the same name which share the same parent node, and associated with each set of sequences of ordinals, a corresponding group of index numbers corresponding to the index numbers in the DOL for those nodes in the DOL for which the associated sequence of ordinals for nodes is true for a traversed pathway from the root node to the specified node, each sequence of ordinals encounterable in parsing from the root node to any other node appearing only once in the ZPath Table.

2. A parser according to claim 1 wherein the parser is adapted to create the DOL as an ordered list of nodes encountered in the DOL when the document is parsed.

3. A parser according to claim 2 wherein the DOL Creator is arranged to produce the DOL depth first, in the order that nodes appear in the document.

4. A parser according to claim 1 wherein (i) the YPath creator is arranged to produce the YPath Table depth first; and/or (ii) the ZPath Creator is arranged to produce the ZPath Table depth first.

5. A parser according to claim 1 adapted to associate in the DOL a type of node category with nodes.

6. A parser according to claim 5 wherein the type associated with a node includes: element nodes, attribute nodes, and text nodes.

7. A parser according to claim 1 wherein the DOL Creator is adapted to create a DOL having a column for index numbers and at least one, or any combinations of columns for:
   (i) node type
   (ii) node name
   (iii) node value.

8. A parser according to claim 1 adapted to parse XML documents.

9. A computer apparatus including a data structure stored in memory of the computing apparatus, the data structure being representative of a document and comprising a Document Order List (DOL), a Node Name Sequence List, and an Ordinal Sequence List; the DOL having a correlation of each node in the document with a unique index number; the Node Name Sequence List having a correlation of (i) each possible sequence of node names encountered in traversing the document from the root node to all nodes with (ii) the index numbers in the DOL associated with nodes for which each particular node name sequence is true; the Ordinal Sequence List having a correlation of (i) each node name ordinal sequence that it is possible to have in traversing the document from the root node to all nodes with (ii) the index numbers in the DOL associated with the nodes in the DOL for which each particular node name ordinal sequence is true; the Node Name Sequence List and the Ordinal Sequence List providing indices accessing and providing queried data in said DOL to a user of said computing apparatus.

10. A computer apparatus including a data structure according to claim 9 which represents an XML document, or other document represented as a tree of connected nodes.

11. A computer apparatus including a data structure according to claim 9 wherein the DOL comprises an index number column associating unique index numbers with each node in the document; and at least one of: (i) a column associating node names with index numbers, for at least some nodes; (ii) a column associating node type with index numbers, for at least some nodes; (iii) node value with index numbers, for at least some nodes.

12. A computer apparatus including a data structure according to claim 11 having all three of (i), (ii) and (iii).

13. A computer apparatus including a data structure according to claim 11 wherein node types associable with a node include one, two or three of: element, attribute and text.

14. A method of querying a data structure representative of a document, the data structure being in accordance with claim 9 comprising the steps of:
   querying the Node Name Sequence List and/or the Ordinal Sequence List for a target node or nodes to identify index numbers associated with the target node and returning the node or nodes associated with identified index numbers in the DOL.

15. A method according to claim 14 further comprising returning all values in the DOL associated with all index numbers identified by querying:
   (i) the Node Sequence List alone; or
   (ii) the Ordinal Sequence List alone; or
   (iv) the common, intersection, index numbers present in querying both the Node Name Sequence List and the Ordinal Sequence List.

16. A method according to claim 15 wherein the query of the Node Sequence List produces a first sequence of index numbers and the query of the Ordinal Sequence List produces a second sequence of index numbers and wherein the common index number or numbers present in both the first and second sequences of index numbers is identified by partitioning each of the two lists into a lower index number range and a higher index number range divided by dividing points respective to each sequence, and comparing index numbers from the lower index number range of the first sequence with index numbers from the lower index number range of the second sequence, and comparing index numbers from the higher index number range of the first sequence with index numbers from the higher index number range of the second sequence.

17. A method according to claim 15 comprising dividing the first and second index number sequences by splitting them into upper and lower ranges and pairing first and second upper and lower sources respectively, to create pairs of index number sequences, and further dividing said pairs to create subsequent generation pairs of index numbers until a match is found between index numbers of said pairs, or subsequent generation pairs, of the first and second index number sequences.

18. A method according to claim 15 comprising comparing both the lowest and highest index numbers in the first sequence of index numbers with both the highest and lowest index numbers of a the second sequence of index numbers, and optionally also comparing the mid point index number in the the first sequence with the mid point index number in the second sequence.

19. A method according to claim 15 comprising comparing the lowest and/or highest index number of the one of (i) the first sequence of index numbers, or (ii) the second sequence of index numbers, with a mid point index number from the other of (i) or (ii).

20. A method according to claim 15 wherein a pair of index number sequences representative of a YPath Query return and a ZPath Query return have index numbers in each of the pair of index number sequences removed from consideration for being the intersection, the removed index numbers comprising:
   (i) those index numbers from one sequence of the pair that are lower than the lowest index number in the other sequence of the pair, and vice-versa, those index numbers from said other sequence of the pair that are lower than the lowest index number in said one sequence of the pair; and
   (ii) those index numbers from one sequence of the pair that are higher than the highest index number of the sequence of the pair, and vice versa, those index numbers from said other sequence of the pair that are higher than the highest index number from said one sequence of the pair.

21. A method according to claim 15 wherein the following checks are performed to determine if a matching index number can be found in the YPath return sequence of index numbers and the ZPath return sequence of index numbers, said checks comprising at least one, some, or all of:

(i) establishing whether the minimum index number of the first sequence equals the minimum index number of the second sequence;
(ii) establishing whether the maximum index number of the first sequence equals the maximum index number of the second sequence;
(iii) establishing whether the minimum index number of the first sequence equals the maximum index number of the second sequence;
(iv) establishing whether the minimum index number of the second sequence equals the maximum index number of the first sequence;
(v) establishing whether the mid index number of the first sequence equals the mid index number of the second sequence.

22. A method according to claim 15 wherein checks are performed to determine if a matching index number can be found in the YPath return sequence of index numbers and the ZPath return sequence of numbers, said checks comprising at least one, some, or all of:
(i) establishing whether the minimum index number of the first sequence equals the mid index number of the second sequence;
(ii) establishing whether the maximum index number of the first sequence equals the mid index number of the second sequence;
(iii) establishing whether the mid index number of the first sequence equals the minimum index number of the second sequence;
(iv) establishing whether the mid index number of the first sequence equals the maximum index number of the second sequence.

23. A method according to claim 21 wherein the mid index number of a sequence is consistently taken as the number below, or consistently taken as the number above, the mid point if there is an even number of index numbers in the sequence.

24. A computer memory holding a YPath Table, an XPath Table and a Document Order List derived from and representative of a document to be queried, the Document Order List comprising a list of nodes in the document and an index number uniquely associated with each node; and wherein
the YPath Table comprises a set of sequences of node names traversed in navigating from a root node to each specific node in the document, and associated with each particular sequence of node names a corresponding list of index numbers representative of the nodes in the document for which that particular node name sequence is true; and
the ZPath Table comprises a set of sequences of ordinals of node names encountered when traversing the document from the root node to any node in the document, and associated with each ordinal sequence the index numbers equivalent to the nodes for which that ordinal sequence for nodes traversed is true.

25. A computer according to claim 24 wherein the index numbers associated with each node name sequence in the YPath Table and/or the ZPath Table are ordered in the sequence in which they are encountered when the document is parsed.

26. A method of making an XPath query comprising resolving the query into a YPath query and a ZPath query, and querying a Ypath Node Name Sequence Table with the YPath query and a ZPath Node Sequence Table with the ZPath query, where YPath is a node name sequence of an XPath sequence but with no ordinals, and where ZPath is an ordinal sequence for a node name sequence of an XPath query, but with no node names; and providing queried data based on said YPath query and ZPath query to a user of a computing apparatus.

27. A method of providing data to a user of a computer apparatus representative of a document stored in a computer readable memory of said computer apparatus, the method comprising storing in the memory a data structure representative of a document comprising a Document Order List, a YPath Table, and a ZPath Table; the Document Order List comprising a correlation between (i) each node in the document being represented and (ii) a unique index number; a YPath Table comprising a correlation between (i) each possible node name sequence traversable in the document to reach a node in the document and (ii) the index numbers for nodes which are locatable using that node name sequence; a ZPath Table comprising a correlation between (i) each possible ordinal sequence for nodes traversed to reach a node in the document and (ii) the index numbers for the nodes which are locatable using that ordinal sequence; the YPath Table and the ZPath Table providing indices accessing and providing queried data in said Document Order List to a user of said computing apparatus.

28. A method according to claim 27 wherein the document is parsed in a depth first ordering system.

29. A method according to claim 27 wherein the document is parsed in a breadth first ordering system.

30. Computer program product for querying a data structure in accordance with claim 9, the software comprising:
a YPath query engine adapted in use when operating on a computer processor, to make a YPath query of the YPath Table for a node or nodes locatable with a specified node name sequence and to return index numbers for nodes satisfying the query;
a ZPath query engine adapted in use when operating on a computer processor, to make a ZPath query of the ZPath Table for a node or nodes locatable with a specified node ordinal sequence and to return index numbers for nodes satisfying the query;
and an intersection locator engine adapted in use, when operating on a computer processor, to identify a node or nodes common to the returns of the YPath and ZPath queries and to return said common nodes.

31. A computer having a computer processor, a program memory, and access to a data structure memory, the processor being adapted to run a YPath and ZPath query of a data structure held on said data structure memory using YPath and ZPath query engine and intersection determining software held in said program memory; and the computer processor being adapted to run document parsing software held on said program memory adapted to parse a document and create and store a Document Order List, a YPath Table and a ZPath Table representative of said document in said data structure memory;
said Document Order List comprising a concordance between (i) each node in the document and (ii) an associated unique index number;
said YPath Table comprising a concordance between (i) each possible node name sequence traversable in the document when parsing it and (ii) index numbers corresponding to nodes locatable using each node name sequence;
said ZPath Table comprising a concordance between (i) ordinal numbers of each possible node path in said document to each node in said document and (ii) index numbers representative of nodes locatable using each ordinal number sequence;

said YPath query engine being adapted to return index numbers corresponding to nodes for which a specified queried node name sequence is true;

said ZPath query engine being adapted to return index numbers corresponding to nodes for which a specified queried ordinal number sequence is true;

said intersection determining software being adapted to identify intersection index numbers present in both the YPath and ZPath query engine returns and to output nodes determined by said intersection index numbers;

said processor being capable of parsing a document to create a document order list, YPath Table, and ZPath Table corresponding to said document and also to query said Document Order List, YPath Table and ZPath Table to retrieve a response to its query.

32. A computer having a computer processor, a program memory, and a data structure memory, the processor being adapted to run a YPath and ZPath query of a data structure representative of an XML document held on said data structure memory using YPath and ZPath query engine and intersection determining software held in said program memory; and the computer processor being adapted to run document parsing software held on said program memory adapted to parse an XML document and create and store a Document Order List, a YPath Table and a ZPath Table derived from said XML document in said data structure memory;

said Document Order List comprising a concordance between (i) each node in the XML document and (ii) an associated unique index number;

said YPath Table comprising a concordance between (i) each possible node name sequence traversable in the XML document when parsing it and (ii) index numbers corresponding to nodes locatable using each node name sequence;

said ZPath Table comprising a concordance between (i) ordinal numbers of each possible node path in said XML document to each node in said XML document and (ii) index numbers representative of nodes locatable using each ordinal number sequence;

said YPath query engine being adapted to return index numbers corresponding to nodes for which a specified queried node name sequence is true;

said ZPath query engine being adapted to return index numbers corresponding to nodes for which a specified queried ordinal number sequence is true;

said intersection determining software being adapted to identify intersection index numbers present in both the YPath and ZPath query engine returns and to output nodes determined by said intersection index numbers;

said processor being capable of parsing a document to create a document order list, YPath Table, and ZPath Table corresponding to said document and also to query said Document Order List, YPath Table and ZPath Table to retrieve a response to its query.

33. A computer having a computer processing means, YPath query means, ZPath query means, intersection determining means, document parsing means and data structure means, the processing means being adapted to operate the YPath and ZPath query means to query the data structure means and to operate the intersection determining means; and the computer processing means also being adapted to operate the document parsing means to parse a document and create and store a Document Order List, a YPath Table and a ZPath Table representative of said document in said data structure means;

said Document Order List comprising a concordance between (i) each node in the document and (ii) an associated unique index number;

said YPath Table comprising a concordance between (i) each possible node name sequence traversable in the document when parsing it and (ii) index numbers corresponding to nodes locatable using each node name sequence;

said ZPath Table comprising a concordance between (i) ordinal numbers of each possible node path in said document to each node in said document and (ii) index numbers representative of nodes locatable using each ordinal number sequence;

said YPath query means being adapted to return index numbers corresponding to nodes for which a specified queried node name sequence is true;

said ZPath query means being adapted to return index numbers corresponding to nodes for which a specified queried ordinal number sequence is true;

said intersection determining means being adapted to identify intersection index numbers present in both the YPath and ZPath query means returns and to output nodes determined by said intersection index numbers;

said processing means being capable of parsing a document to create a document order list, YPath Table, and ZPath Table corresponding to said document and also to query said Document Order List, YPath Table and ZPath Table to retrieve a response to its query.

34. A document parser comprising:

a correlator adapted to allocate to each node in a document a unique index number;

a YPath table generator adapted to associate, to each of a plurality of unique sequences of node names which are encountered in traversing to a given node from a root node, index numbers for which an associated sequence of node names is true; and a Zpath table generator adapted to associate, to each of a plurality of unique sequences of ordinal numbers (of relative node position amongst nodes of the same name and sharing a common parent node) which are encountered in traversing to a given node from the root node, index numbers for which an associated sequence of ordinal numbers is true.

35. A document parser according to claim 34 wherein the correlator is adapted to generate a list of nodes encountered when the document is parsed.

36. A document parser according to claim 34 wherein the correlator is adapted to list the nodes in the order they appear in the document.

37. A document parser according to claim 34 wherein the YPath and/or ZPath table generators are adapted to list sequences in the order they appear in the document.

38. A computer adapted to run the document parser of claim 34, and comprising means for establishing an index number which is true for both a sequence of node names and a sequence of ordinal numbers.

* * * * *